(12) United States Patent
Dhawan et al.

(10) Patent No.: US 10,580,024 B2
(45) Date of Patent: Mar. 3, 2020

(54) CONSUMER INFLUENCE ANALYTICS WITH CONSUMER PROFILE ENHANCEMENT

(71) Applicant: Adobe Inc., San Jose, CA (US)

(72) Inventors: Anmol Dhawan, Ghaziabad (IN); Sachin Soni, New Delhi (IN); Russell R. Stringham, Orem, UT (US); Kevin Smith, Lehi, UT (US); Ashish Duggal, Delhi (IN)

(73) Assignee: Adobe Inc., San Jose, CA (US)

( * ) Notice: Subject to any disclaimer, the term of this patent is extended or adjusted under 35 U.S.C. 154(b) by 1013 days.

(21) Appl. No.: 15/008,104

(22) Filed: Jan. 27, 2016

(65) Prior Publication Data

US 2017/0169455 A1 Jun. 15, 2017

Related U.S. Application Data

(60) Provisional application No. 62/267,610, filed on Dec. 15, 2015.

(51) Int. Cl.
*G06Q 30/02* (2012.01)
*G06Q 50/00* (2012.01)

(52) U.S. Cl.
CPC ......... *G06Q 30/0205* (2013.01); *G06Q 50/01* (2013.01)

(58) Field of Classification Search
CPC ............................ G06Q 30/0205; G06Q 50/01
USPC ......................................................... 705/7.34
See application file for complete search history.

(56) References Cited

U.S. PATENT DOCUMENTS

| 8,271,316 | B2 | 9/2012 | Blackshaw et al. |
| 8,788,438 | B2 | 7/2014 | Kvernvik et al. |
| 9,558,277 | B2 | 1/2017 | Pappas |
| 9,639,862 | B2 | 5/2017 | Darwin |
| 9,811,597 | B2 | 11/2017 | Pappas |

(Continued)

OTHER PUBLICATIONS

Chin, Alvin et al. Connecting People through Physical Proximity and Physical Resources at a Conference. ACM Transactions on Intelligent Systems and Technology. 4.3 Assoc Computing Machinery. (Jun. 2013).*

(Continued)

*Primary Examiner* — Timothy Padot
(74) *Attorney, Agent, or Firm* — Finch & Maloney PLLC

(57) ABSTRACT

Offline consumer behavior and interactions are observed using beacons positioned at venues where consumers spend time and interact with each other. The beacons communicate with mobile computing devices that are carried by the observed consumers. The observed consumer behavior provides actionable insights into how consumers influence each other. For example, the people that a particular consumer spends time with form a "circle of influence" associated with that consumer. If the consumer makes a purchase, members of the circle of influence are observed to understand the degree to which they were influenced by the purchase, if at all. Metrics that quantify a consumer's influence over other consumers allow marketers to more effectively target both the influencing and influenced consumers. Also, if relatively little information is known about a particular consumer, that consumer's digital marketing profile can be supplemented using information known about the consumers with whom he/she often spends time.

12 Claims, 14 Drawing Sheets

(56) References Cited

U.S. PATENT DOCUMENTS

| | | | |
|---|---|---|---|
| 9,948,683 | B2 | 4/2018 | Weinstein et al. |
| 10,110,435 | B2 | 10/2018 | Palanciuc et al. |
| 10,115,167 | B2 | 10/2018 | Shen et al. |
| 2002/0146395 | A1 | 10/2002 | Weinstein |
| 2003/0033237 | A1 | 2/2003 | Bawri |
| 2005/0013829 | A1 | 1/2005 | Weinstein |
| 2008/0004950 | A1* | 1/2008 | Huang .................. G06Q 30/02 705/14.67 |
| 2009/0018918 | A1 | 1/2009 | Moneypenny et al. |
| 2009/0076894 | A1* | 3/2009 | Bates .................... G06Q 30/02 705/14.61 |
| 2009/0319359 | A1 | 12/2009 | Soza et al. |
| 2011/0173198 | A1* | 7/2011 | Malleshaiah ........ G06F 16/337 707/737 |
| 2012/0042280 | A1* | 2/2012 | Hoffman ........... G06Q 30/0251 715/800 |
| 2013/0151330 | A1 | 6/2013 | Evancich et al. |
| 2013/0173368 | A1 | 7/2013 | Boutin et al. |
| 2013/0254192 | A1 | 9/2013 | Work et al. |
| 2013/0290414 | A1* | 10/2013 | Rait ...................... G06Q 50/01 709/204 |
| 2013/0318085 | A1* | 11/2013 | Pepper ................. G06Q 10/10 707/737 |
| 2013/0332460 | A1* | 12/2013 | Pappas ................ G06F 16/951 707/740 |
| 2014/0025478 | A1 | 1/2014 | Mischuk et al. |
| 2014/0089043 | A1 | 3/2014 | Weinstein et al. |
| 2014/0108139 | A1 | 4/2014 | Weinstein et al. |
| 2014/0180804 | A1 | 6/2014 | Jordan et al. |
| 2014/0258288 | A1 | 9/2014 | Work et al. |
| 2014/0317126 | A1 | 10/2014 | Work et al. |
| 2015/0248651 | A1* | 9/2015 | Akutagawa ........ G06Q 10/1095 705/7.19 |
| 2016/0014677 | A1* | 1/2016 | Chen ..................... H04W 4/21 455/434 |
| 2016/0134934 | A1 | 5/2016 | Jared et al. |
| 2016/0314501 | A1 | 10/2016 | Bartholomew et al. |
| 2016/0381092 | A1* | 12/2016 | Dash .................... H04L 65/403 715/752 |
| 2017/0076323 | A1 | 3/2017 | Palanciuc et al. |
| 2017/0124595 | A1 | 5/2017 | Costache et al. |
| 2017/0266157 | A1 | 9/2017 | Weinstein |
| 2018/0140576 | A1 | 5/2018 | Weinstein |
| 2018/0144050 | A1 | 5/2018 | Whillock et al. |
| 2018/0349961 | A1 | 12/2018 | Vaswani et al. |

OTHER PUBLICATIONS

Adobe(R) Marketing Cloud, "Adobe Analytics Implementation", updated Dec. 9, 2014 (retreived from <http://microsite.omniture.com/t2/help/en_US/sc/implement/oms_sc_implement.pdf> on Aug. 22, 2015).

Aral et al., "Identifying Influential and Susceptible Members of Social Networks", Science, vol. 337, pp. 337-341 (Jul. 2012).

Tang et al., "Social influence analysis in large-scale networks" in Proceedings of the 15th ACM SIGKDD international conference on knowledge discovery and data mining, doi 10.1145/1557019.1557108, pp. 807-816 (2009).

Valente, "Social network thresholds in the diffusion of innovations", Social Networks, vol. 18, issue 1, pp. 69-89 (Jan. 1996).

Abramovich, Giselle, "15 Mind Blowing Stats About Personalization", Feb. 20, 2015 (retreived from <http://www.cmo.com/articles/2015/2/18/mind-blowing-stats-personalization.html on Nov. 18, 2015).

Sarkar, Amrita, "Apple iBeacon will now work when the app is closed: Is this a game changer?", Mar. 31, 2014 (retreived from <http://corp.qliktag.com/apple-ibeacon-will-now-work-when-the-app-is-closed-is-this-a-game-changer/> on Aug. 22, 2015).

Schuman, Evan, "Coke's movie theater trial shows beacon potential", Computerworld.com, Aug. 25, 2015 (retreived from <http://www.computerworld.com/article/2974716/retail-it/cokes-movie-theater-trial-shows-beacon-potential.html> on Aug. 25, 2015).

Getting Started with iBeacon, Version 1.0, Jun. 2, 2014 (retreived from <https://developer.apple.com/ibeacon/Getting-Started-with-iBeacon.pdf> on Aug. 23, 2015).

* cited by examiner

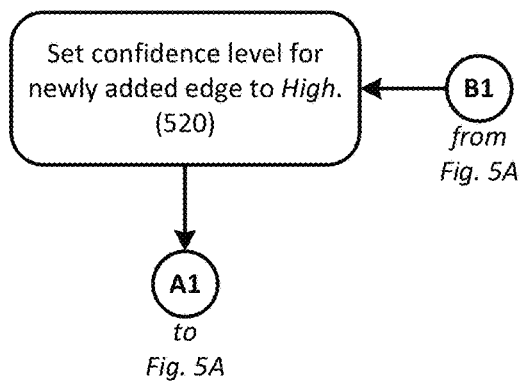
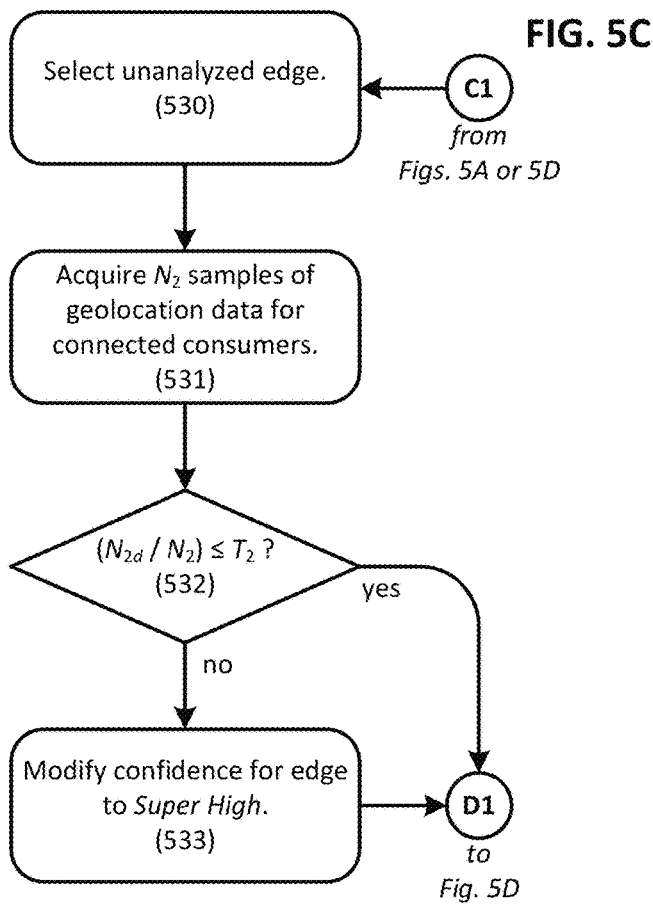

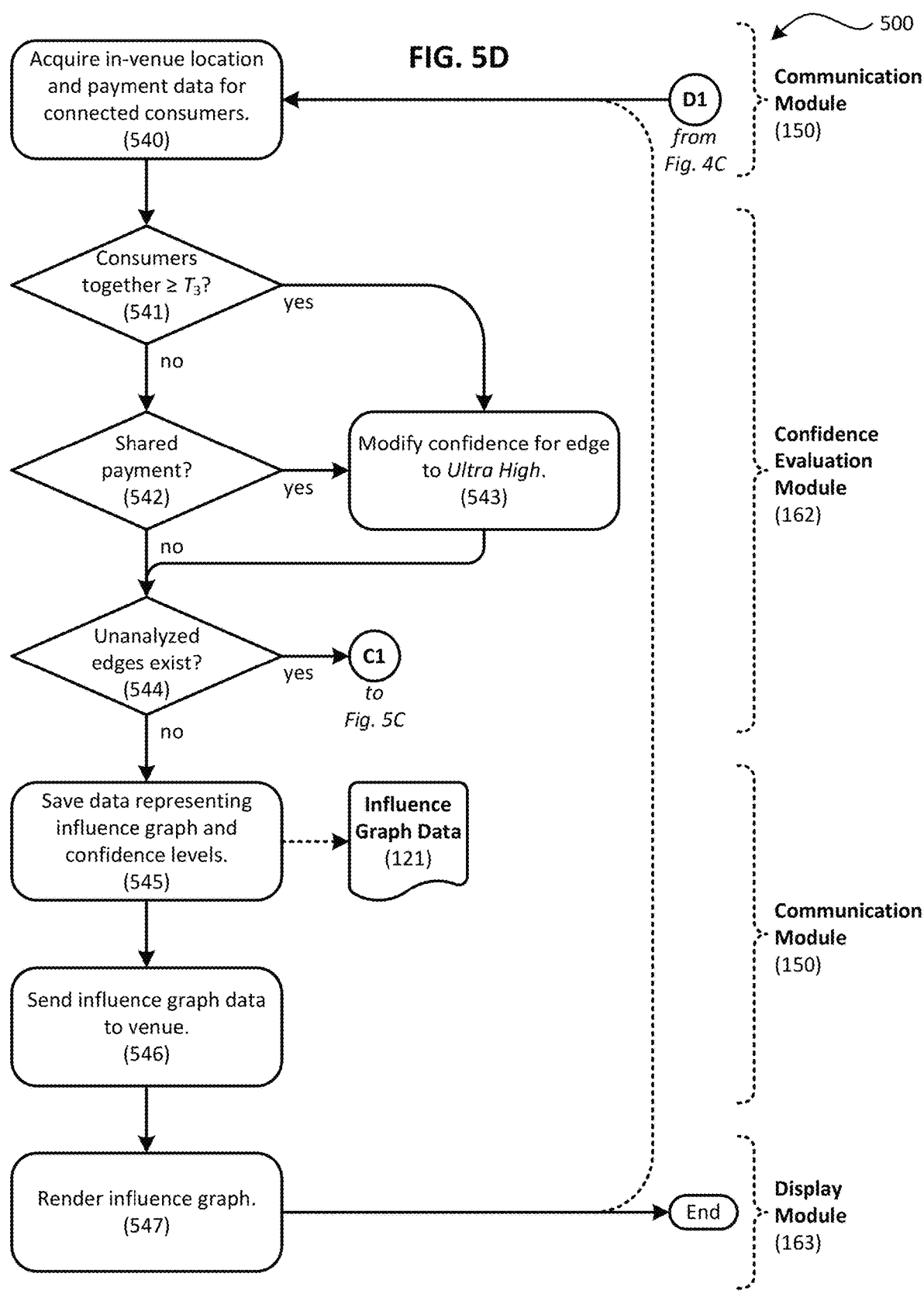

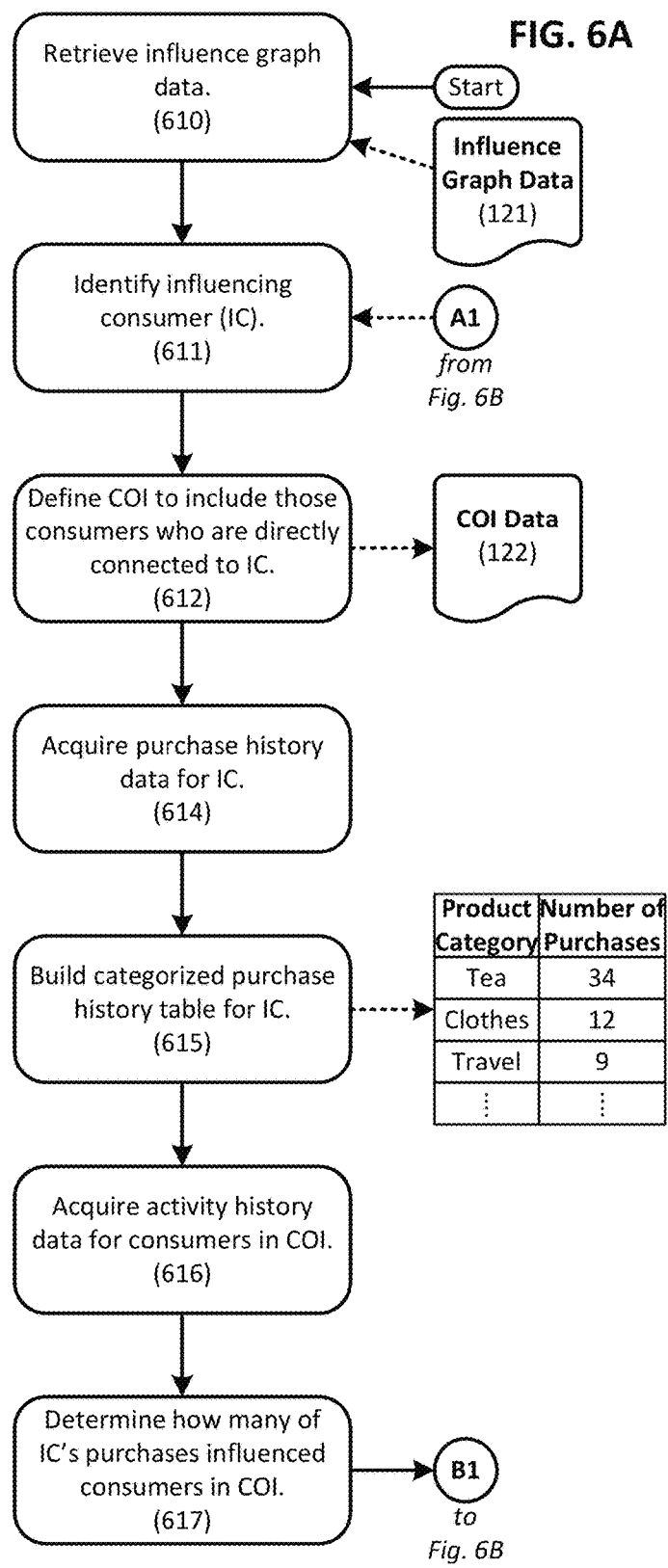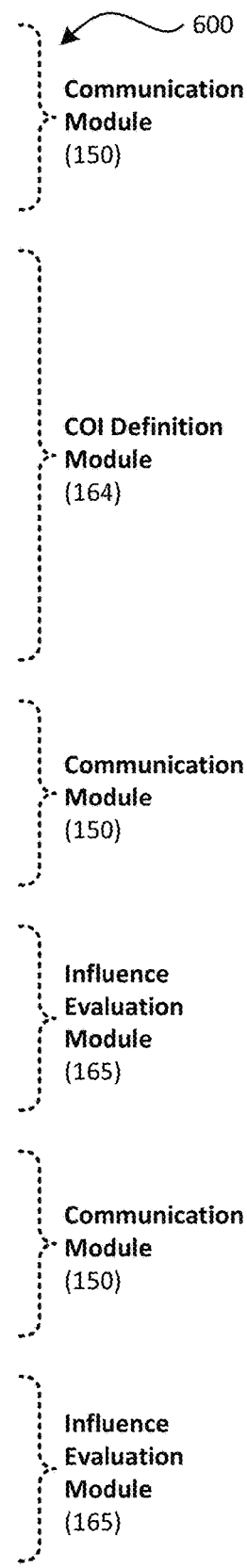
FIG. 6A

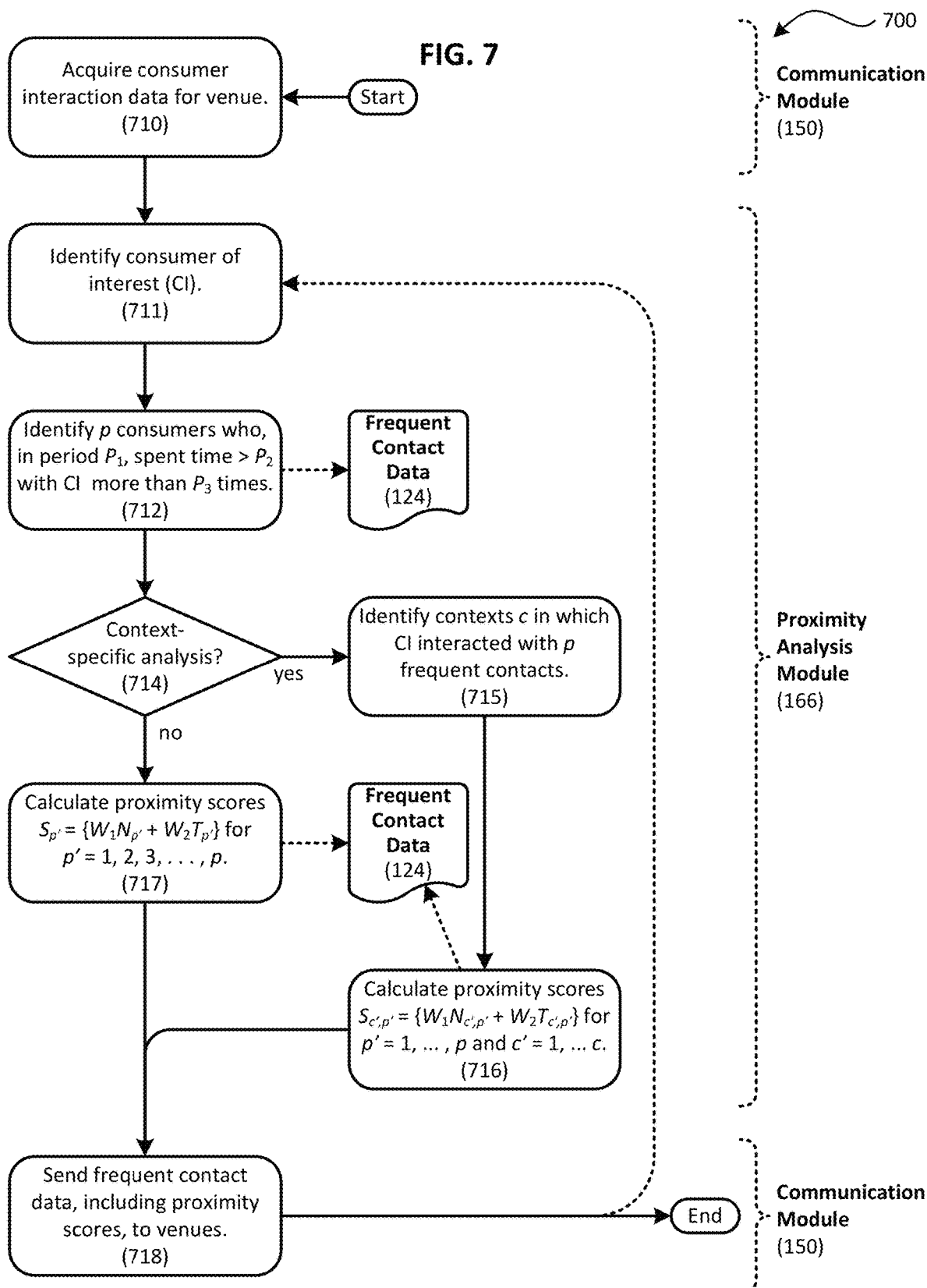

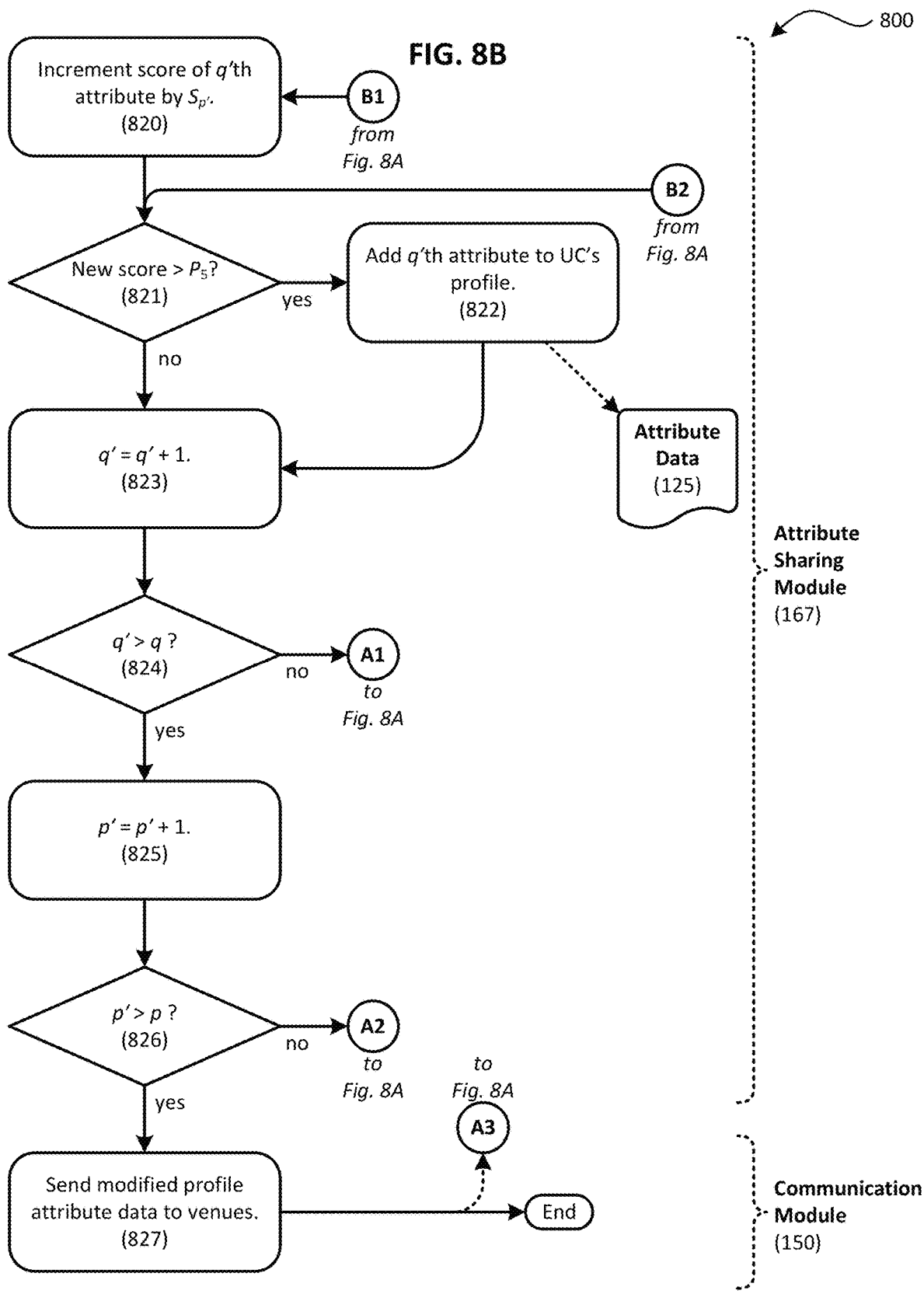

FIG. 9

| Consumer Analytics Parameters<br>Influence Graphing and Confidence Evaluation | | |
|---|---|---|
| Parameter | Name | Description |
| $\delta t_{in}$ | threshold time difference for venue entry | If two consumers enter a venue at times that are separated by $\delta t_{in}$ or more, they are not within each other's circle of influence. |
| $\delta t_{out}$ | threshold time difference for venue exit | If two consumers exit a venue at times that are separated by $\delta t_{out}$ or more, they are not within each other's circle of influence. |
| $N_1$ | number of same-day visits | Number of times that a given pair of consumers visited the same venue on the same day. |
| $N_{1t}$ | number of same-day time-synced visits | Of the $N_1$ same-day visits, number of visits that have entry and exit times within the $\delta t_{in}$ and $\delta t_{out}$ thresholds, respectively. |
| $T_1$ | threshold proportion of time-synced visits | If $(N_{1t} / N_1) \leq T_1$ for a given pair of consumers, they are not within each other's circle of influence. |
| $\delta d$ | threshold geolocation difference | If two geolocation data samples are within distance $\delta d$, they are considered to be together. |
| $N_2$ | number of geolocation data samples | For a given pair of consumers connected with *High* confidence, number of geolocation data samples that are considered. |
| $N_{2d}$ | number of geolocation data samples within $\delta d$ | Of the $N_2$ geolocation data samples, number of samples that are within the $\delta d$ threshold. |
| $T_2$ | threshold proportion of geolocation samples | If $(N_{2d} / N_2) \leq T_2$ for a given pair of consumers, the confidence in their connection does not exceed *High*. |
| $T_3$ | threshold time for *Ultra High* confidence link | If two consumers connected with *High* or *Super High* confidence are together in a venue for a duration greater than $T_3$, the confidence in their connection is *Ultra High*. |

FIG. 10

| | Consumer Analytics Parameters | |
|---|---|---|
| | Proximity Scoring and Attribute Propagation | |
| Parameter | Name | Description |
| $P_1$ | time period for proximity analysis | A consumer's interactions during time period $P_1$ are analyzed to identify proximity events. |
| $P_2$ | threshold time for proximity event | If two consumers spend time > $P_2$ together, this is a "proximity event" for identifying frequent contacts. |
| $P_3$ | threshold number of proximity events | If, in time period $P_1$, two consumers have > $P_3$ proximity events, the two consumers are "frequent contacts". |
| $p$ | number of frequent contacts | Number of frequent contacts for a consumer of interest. |
| $p'$ | counter for frequent contacts | Counter for iterative processing of $p$ frequent contacts. |
| $c$ | number of frequent contact interaction contexts | Number of contexts in which a consumer of interest interacted with $p$ frequent contacts. |
| $c'$ | counter for frequent contact interaction contexts | Counter for iterative processing of $c$ interaction contexts. |
| $W_1$ | weight for proximity event frequency | Weight factor for number of observed proximity events. |
| $N_{p'}$ | number of proximity events | Number of observed proximity events for the $p'$th frequent contact. |
| $N_{c',p'}$ | number of proximity events | Number of observed proximity events for the $p'$th frequent contact in the $c'$th interaction context. |
| $W_2$ | weight for total proximity event duration | Weight factor for total duration of observed proximity events. |
| $T_{p'}$ | total proximity event duration | Total duration of the $N_{p'}$ proximity events for the $p'$th frequent contact. |
| $T_{c',p'}$ | total proximity event duration | Total duration of the $N_{p'}$ proximity events for the $p'$th frequent contact in the $c'$th interaction context. |
| $S_{p'}$ | $p'$th proximity score | $S_{p'} = W_1 N_{p'} + W_2 T_{p'}$, where $p' = 1, 2, 3, \ldots, p$. |
| $S_{c',p'}$ | $p'$th proximity score for $c'$th interaction context | $S_{c',p'} = \{W_1 N_{c',p'} + W_2 T_{c',p'}\}$, where $p' = 1, 2, 3, \ldots, p$ and $c' = 1, 2, 3, \ldots, c$. |
| $q$ | number of asymmetrical attributes | Number of attributes in a frequent contact's profile, but not in the profile of the associated consumer of interest. |
| $q'$ | counter for asymmetrical attributes | Counter for iterative professing of $q$ asymmetrical attributes. |
| $P_5$ | threshold score for adding asymmetrical attribute | If an asymmetrical attribute is associated with a score greater than $P_5$, it is added to the unknown contact's profile. |

US 10,580,024 B2

CONSUMER INFLUENCE ANALYTICS WITH CONSUMER PROFILE ENHANCEMENT

CROSS-REFERENCE TO RELATED APPLICATION

This application claims the benefit of U.S. Provisional Patent Application 62/267,610 (filed 15 Dec. 2015), the entire disclosure of which is hereby incorporated by reference herein.

FIELD OF THE DISCLOSURE

This disclosure relates generally to consumer behavioral analysis, and more specifically to techniques for observing consumer behavior and interactions, and using such observations to draw inferences about how consumers can influence each other.

BACKGROUND

One of the fundamental challenges that a business faces is the ongoing need to attract new consumers and retain existing consumers. The field of marketing has grown to address this challenge, the result of which has been the development of a wide variety of market research methods that can be used to analyze the characteristics and activities of potential consumers. Ideally, this analysis produces actionable insights that allow marketers to specifically target those consumers who are most likely to be interested in the marketer's solicitation. In particular, this allows marketers to avoid broadcasting generalized announcements to large audiences, and instead focus their efforts on sending targeted solicitations to a relatively small number of carefully selected recipients. Marketers have extended this approach to the online realm, and have devoted substantial resources to analyzing the online activities of, and building digital marketing profiles for, their potential consumers. However, despite the growing popularity and availability of online shopping resources, the vast majority of retail sales are still transacted offline in traditional brick-and-mortar stores. And even when a consumer does make an online purchase, offline activities still often significantly influence the purchase decision. Sometimes these offline activities may be directly associated with a retail establishment, such as when a consumer visits a store to evaluate and compare different products before ultimately making an online purchase. But often these offline activities are not directly associated with a retail outlet, such as when a consumer casually discusses a recent purchase with family, friends, or coworkers. Either way, there is a growing appreciation that offline events and activities often significantly affect purchase decisions, regardless of whether the purchase is ultimately consummated online or offline.

BRIEF DESCRIPTION OF THE DRAWINGS

FIGS. 5A through 5D comprise a flowchart illustrating an example influence graphing method for building an influence graph that shows how consumers who have spent time together can influence each other.

FIGS. 6A and 6B comprise a flowchart illustrating an example influence evaluation method for determining a circle of influence for an influencing consumer, the degree to which the influencing consumer influences other consumers in the circle of influence, and the aggregate influence wielded by the influencing consumer.

FIG. 7 is a flowchart illustrating an example frequent contact identification method for identifying frequent contacts associated with a consumer of interest, and for assigning a proximity score to each of the identified frequent contacts.

FIGS. 8A and 8B comprise a flowchart illustrating an example attribute propagation method for modifying a marketing profile of an unknown consumer based on marketing profile attributes of one or more frequent contacts of the unknown consumer.

FIG. 9 is a table listing consumer analytics parameters used in certain implementations of the influence graphing methods disclosed herein.

FIG. 10 is a table listing consumer analytics parameters used in certain implementations of the frequent contact identification and attribute propagation methods disclosed herein.

DETAILED DESCRIPTION

Figure 1:
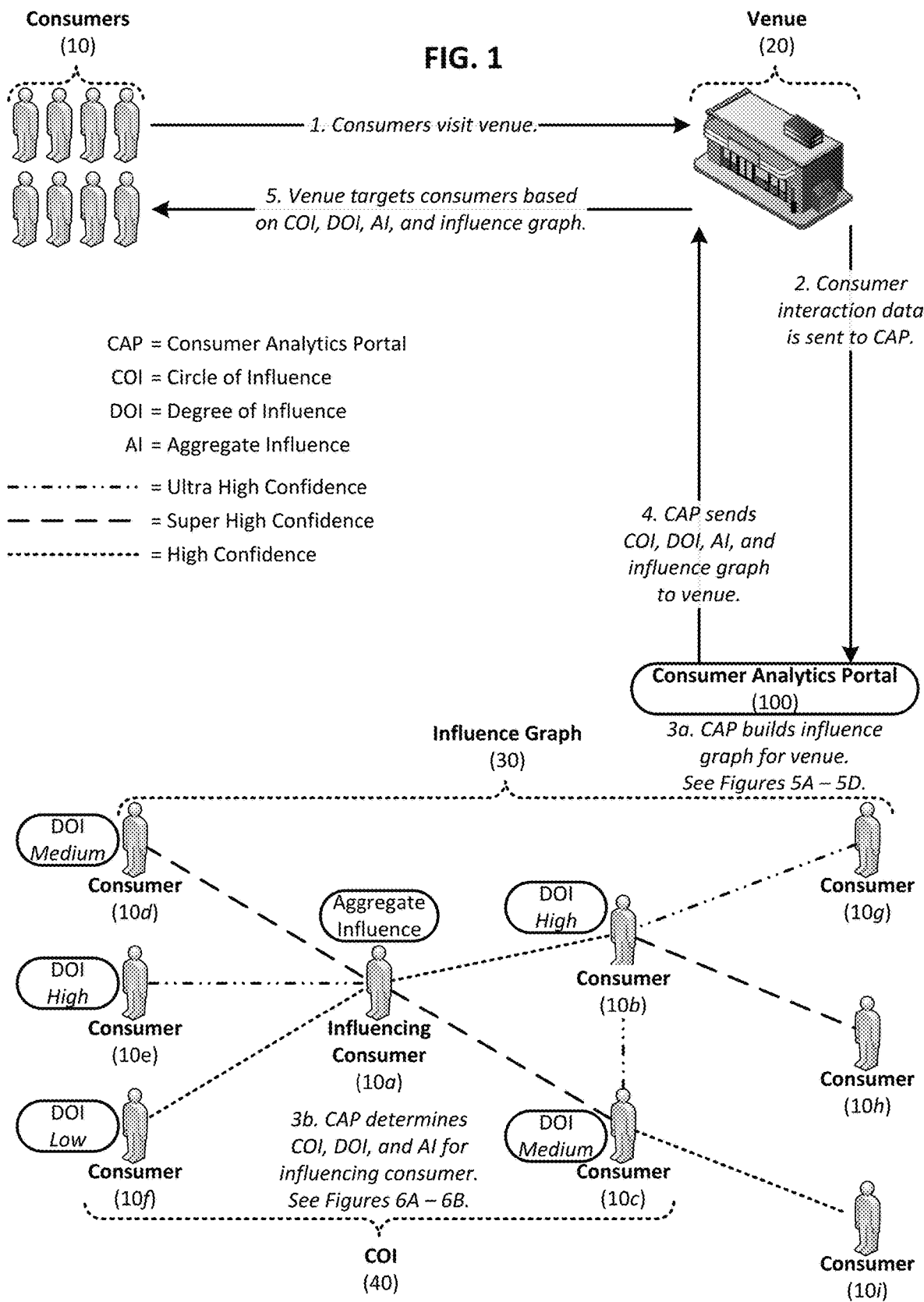
FIG. 1 is a block diagram schematically illustrating an example workflow for analyzing how an influencing consumer interacts with and influences other consumers, and for using such interaction analysis to allow marketers to more effectively target the influencing consumer and the other consumers.

While marketers often devote significant resources to analyzing a consumer's online activities and creating a detailed digital marketing profile for the consumer based on such analysis, less attention has been devoted to analyzing a consumer's offline activities. One reason for this is the fact that the consumer's offline activities often do not involve direct interaction with a computer system, thus making such activities more difficult to observe, record, and analyze. Mobile computing devices, such as smartphones, may provide some insight into a consumer's location while conducting certain online activities, but even this information is limited to interactions between the consumer and the smartphone. Such information generally does not, for example, accurately reflect offline consumer-to-consumer interactions. A consumer profile that fails to adequately represent the consumer's offline activities will not be as accurate as a more comprehensive profile, and therefore will not allow a marketer to target the consumer as effectively. Furthermore, a consumer profile that is based only on online activities will be less valuable to a marketer who wishes to target the consumer in an offline context, for example, as the consumer shops in a retail outlet. Existing digital marketing profiles therefore omit substantial, and potentially valuable, portions of a consumer's activity. This is especially problematic given that retail sales still overwhelmingly occur offline, and further given that offline activities often significantly influence online purchase decisions. This prevents marketers from effectively targeting consumers in both online and offline environments.

Thus, and in accordance with certain of the embodiments disclosed herein, improved consumer behavioral analysis techniques involve observing consumer behavior and interactions in an offline environment. These observations can be made using, for example, beacons that are positioned at retail outlets, restaurants, stadiums, and other venues where consumers are likely to spend time and interact with each other. The beacons are capable of communicating with mobile computing devices, such as smartphones, that are carried by the observed consumers. The observed consumer behavior provides actionable insights into how consumers influence each other. For example, the people that a particular consumer often spends time with can be understood as forming a "circle of influence" associated with that consumer. If the consumer makes a purchase, members of the circle of influence can be observed to understand the degree to which they were influenced by the purchase, if at all. Metrics that quantify a consumer's influence over other consumers allow marketers to more effectively target both the influencing and influenced consumers. In addition, if relatively little information is known about a particular consumer, that consumer's digital marketing profile can be supplemented based on information known about the consumers with whom he/she often spends time. This supplemented marketing profile can be used to more effectively target the consumer about which relatively little would otherwise have been known. Numerous configurations, modifications, and alternative implementations will be apparent in light of this disclosure.

A number of advantages are associated with certain of the disclosed embodiments. For instance, certain embodiments provide for the creation of a digital marketing profile that more accurately represents a consumer's offline activities. This allows the consumer to be targeted more effectively, particularly where such targeting will occur in an offline environment such as a brick-and-mortar retail outlet. In some implementations a first consumer's digital marketing profile will define a circle of influence that encompasses other consumers with whom the first consumer often spends time. This allows consumers in the circle of influence to be targeted based on the activities of the first consumer. While a circle of influence can also be defined by analyzing online activities, for example by inspecting a consumer's social networking contacts, certain of the offline behavioral analysis techniques disclosed herein allow the circle of influence to be defined with far greater specificity. In particular, observing that two consumers meet for coffee several times a week, or shop together at a particular sporting goods store allows the consumers' influence with each other to be more precisely defined with respect to particular contexts in which the consumers interact. This facilitates targeting that would be difficult or impossible using only online observations. These and other advantages will be apparent in light of this disclosure.

Certain of the embodiments disclosed herein take advantage of the strength of word-of-mouth marketing. Word-of-mouth marketing can be understood as occurring when a consumer-to-consumer interaction produces a product recommendation. While word-of-mouth marketing can occur both online and offline, the overwhelming majority takes place offline. Consumers also perceive offline word-of-mouth interactions to be more trustworthy than online word-of-mouth interactions. Word-of-mouth marketing is generally considered to be one of the most effective marketing channels, largely because consumers consider their family, friends, and other acquaintances to be especially trustworthy, particularly in comparison to a commercial solicitation received from a marketer. Marketers can leverage this pre-established trust by creating digital marketing profiles that are based on offline interactions with trusted peers and by implementing targeted campaigns that rely on these profiles.

FIG. 1 is a block diagram schematically illustrating an example workflow for analyzing how an influencing consumer interacts with and influences other consumers, and for using this interaction analysis to allow marketers to more effectively target the influencing consumer and the other consumers. As illustrated, this workflow commences with a plurality of consumers 10 visiting a venue 20 such as a retail store, a restaurant, a stadium, or any other place where consumers are apt to spend time and interact with each other. In one implementation, a large population of consumers visits the venue over an extended period of time, such as several days, weeks, or months. The venue includes a number of beacons that are positioned at locations that facilitate analysis of consumer activity at the venue. For example, positioning beacons at entry/exit points provides insight into how much time a particular consumer spent at the venue, and who, if anyone, accompanied the consumer to the venue. Positioning beacons in specific departments or areas within the venue provides insight into how the consumer spent time at the venue, and thus provides insight into the consumer's interests. Positioning a beacon at a restaurant table provides insight into who, if anyone, the consumer dined with. Beacons can be positioned in an essentially unlimited range of locations in and around the venue, including on shopping carts, merchandise, checkout stands, fitting rooms, stadium seating, snack bars, customer service desks, parking kiosks, and the like.

Many of the consumers who visit the venue will carry a smartphone or other portable computing device. An application running on such a device can record information received from the aforementioned beacons as the consumer who owns the device moves about the venue. In one implementation the communications from the beacons to the portable computing device are background communications, and thus do not necessarily require any input or acknowledgement from the consumer. Thus, as the consumer moves about the venue, the application will generate consumer interaction data that indicates which beacons have been observed by the consumer's device, and when such observations have occurred. Proximity data that reflects an estimate of the distance to an observed beacon is optionally recorded as well. This consumer interaction data is sent to a consumer analytics portal 100 periodically. In general, as consumers 10 are observed at venue 20 over an extended period of several days, weeks, or months, consumer analytics portal 100 will collect a large volume of consumer interaction data from which actionable insights can be extracted. While FIG. 1 illustrates a plurality of consumers visiting a single venue, it will be appreciated that in alternative embodiments consumer interaction data can be collected based on observations made at a plurality of different venues.

Still referring to the example implementation schematically illustrated in FIG. 1, consumer analytics portal 100 builds an influence graph 30 for venue 20. An influence graph comprises a plurality of nodes, each of which represents one of the plurality of consumers. The consumer interaction data collected by the consumer analytics portal may reveal that two consumers were observed together frequently, or were otherwise observed in a context that would suggest that they may influence each other's purchasing decisions. Where this is the case, the nodes representing these two consumers are connected by an edge in the influence graph. Each edge is optionally associated with a degree of confidence in the relationship between the two consumers. For example, consumers who were observed grocery shopping together once or twice a month may be connected by an edge having a High degree of confidence, while consumers who were observed together at the café every morning may be connected by an edge having a Super High degree of confidence. In alternative embodiments consumers who are observed together occasionally at several different types of venues may be connected by an edge having a Super High degree of confidence. Additional details regarding how the influence graph can be built are illustrated in FIGS. 5A through 5D, and are described in the "Methodology: Influence Graphing" subsection provided herein.

A wide range of insights can be extracted from an influence graph. For instance, the consumer analytics portal can be configured to determine a circle of influence for a particular consumer by identifying other consumers who are directly connected to the particular consumer via an edge in the influence graph. In this context, the particular consumer may be referred to as an "influencing consumer". Referring to the example influence graph 30 illustrated in FIG. 1, an influencing consumer 10a is directly connected to consumers 10b, 10c, 10d, 10e, and 10f, and therefore these consumers fall within a circle of influence 40 associated with influencing consumer 10a. On the other hand, consumers 10g, 10h, and 10i are not directly connected to influencing consumer 10a via an edge in influence graph 30, and therefore do not fall within circle of influence 40. While FIG. 1 illustrates a single circle of influence (for influencing consumer 10a), it will be appreciated that, in general, each node in the influence graph may be associated with its own circle of influence, provided that node is connected to at least one other node. A consumer that is not understood as significantly influencing any other consumers will not be associated with a circle of influence.

Figure 6B:
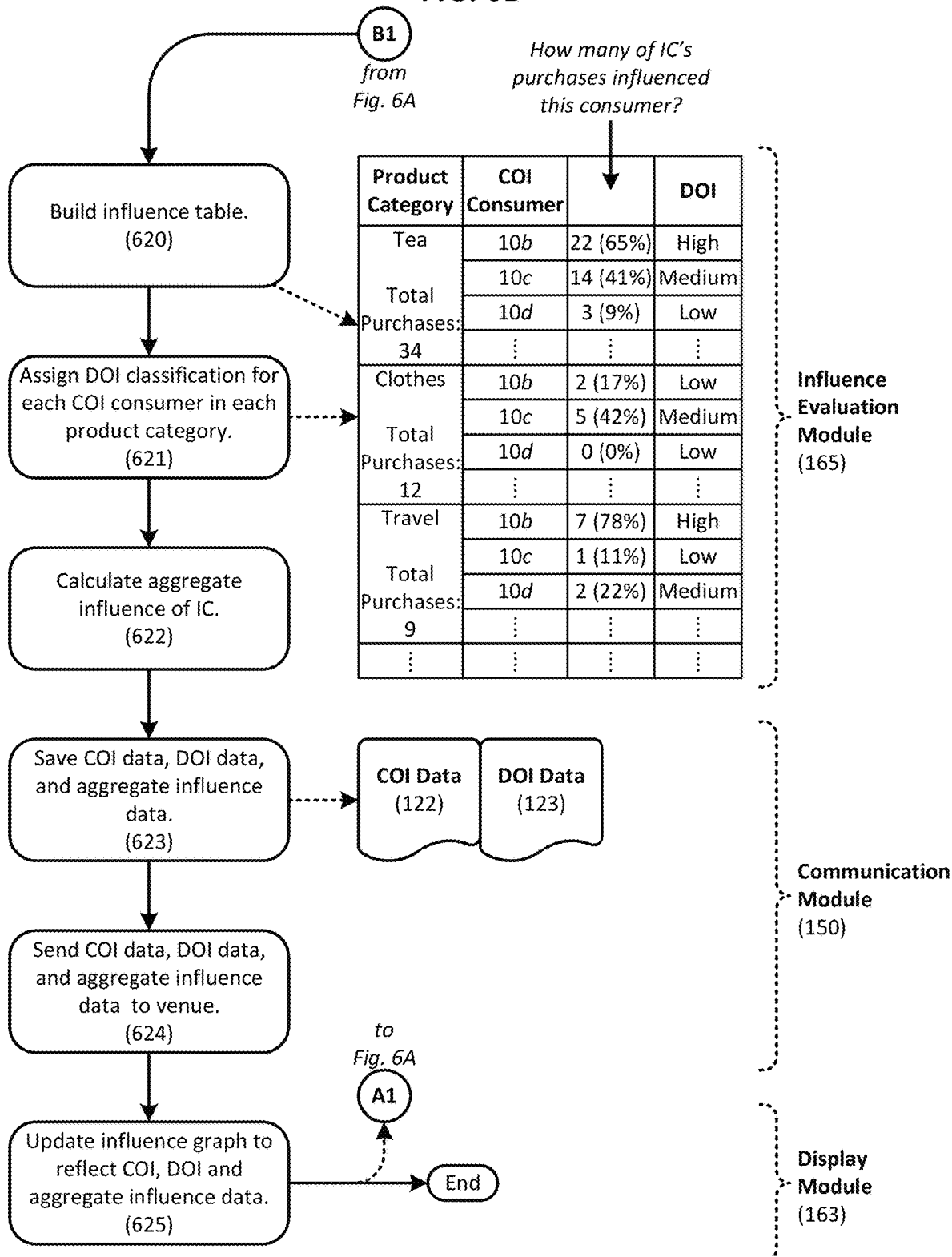

In addition to evaluating which consumers influence each other, as revealed by the influence graph, in certain embodiments the consumer analytics portal also evaluates the degree of influence that is wielded. The degree of influence can be evaluated by observing how the consumers in a circle of influence respond to a purchase made by the influencing consumer. For example, if Anna purchases a new pair of sunglasses, consumers in Anna's circle of influence can be observed to see if they purchase the same sunglasses, purchase similar sunglasses, or simply browse sunglasses in offline or online store. Thus, FIG. 1 illustrates that each of the consumers in circle of influence 40 is associated with a degree of influence score that represents the degree to which influencing consumer 10a influences them. Collectively, these scores can be aggregated into an aggregate influence score associated with influencing consumer 10a. While FIG. 1 illustrates that each consumer in the circle of influence is associated with a single degree of influence score, in other implementations different influence scores can be assigned for different product categories. For example, if Bob's only interaction with Carla is a weekly meeting at the gym, then Bob may have a relatively high degree of influence over Carla within the product category "sporting goods", but may have a relatively low degree of influence within the product category "electronic gadgets". Additional details regarding how the circle of influence, the degree of influence scores, and the aggregate influence scores are determined are illustrated in FIGS. 6A and 6B, and are described in the "Methodology: Influence Evaluation" subsection provided herein.

Once the consumer analytics portal generates the influence graph, the circles of influence, the degree of influence scores, and/or the aggregate influence scores, these analytics can be provided to a marketer who may, for example, be associated with the venue where the consumer interactions were initially observed. These analytics enable the marketer to more specifically target consumers. For example, if Don is observed as having recently purchased a smart watch at the Acme Electronics Store, and if the analytics provided by consumer analytics portal reveal that Don has a high degree of influence over Emily in the product category "electronic gadgets", then a marketer associated with the Acme Electronic Store can use these insights to send a targeted solicitation to Emily. This represents one example of how consumer behavioral analysis can be used to increase the efficacy of a digital marketing campaign in both online and offline contexts.

Figure 2:
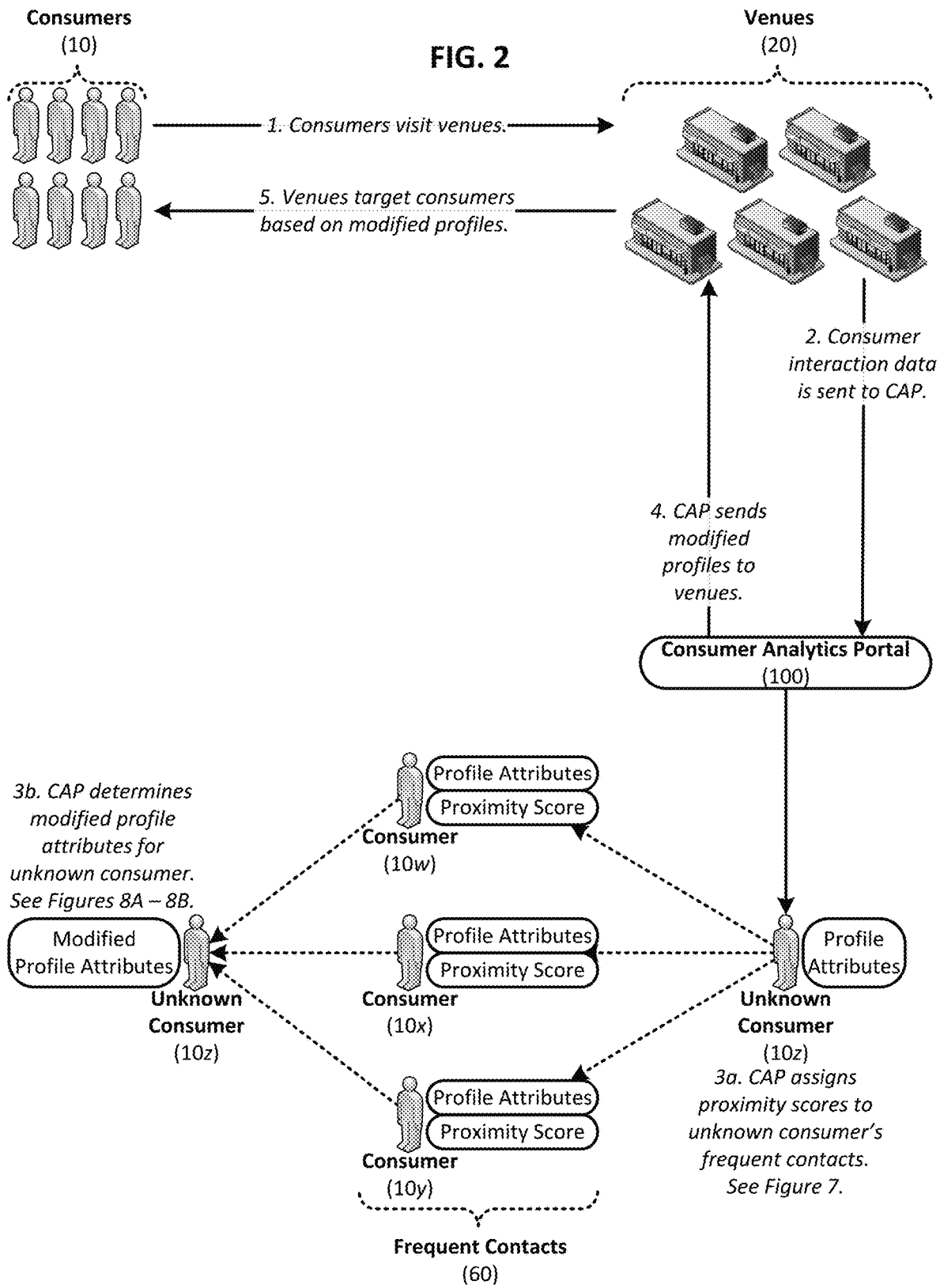
FIG. 2 is a block diagram schematically illustrating an example workflow for analyzing how a relatively unknown consumer interacts with and is influenced by his/her frequent contacts, and for using such interaction analysis to selectively propagate attributes from a frequent contact's digital marketing profile to the relatively unknown consumer's profile.

Another example of using consumer behavioral analysis to improve a digital marketing campaign is illustrated in FIG. 2. In particular, FIG. 2 is a block diagram schematically illustrating another example workflow for analyzing how a relatively unknown consumer interacts with and is influenced by his/her frequent contacts. In this case the interaction analysis is used to selectively propagate attributes from a frequent contact's digital marketing profile to the relatively unknown consumer's profile. This workflow commences with a plurality of consumers 10 visiting one or more venues 20. As with the workflow illustrated in FIG. 1, venues 20 include a number of beacons that, in conjunction with applications running on portable computing devices carried by consumers 10, allow consumer interaction data to be aggregated at consumer analytics portal 100. Certain of the consumers who are observed at the venues may have a sparsely populated or unpopulated digital marketing profile. Such consumers may be referred to herein as "unknown consumers" or "relatively unknown contacts". Because relatively little information is known about unknown consumers, it is particularly difficult for marketers to target them effectively. One way of learning more about an unknown consumer is to use consumer interaction data to identify one or more other consumers who spent more than a threshold amount of time with the unknown consumer. These other consumers may be referred to as "frequent contacts" of the unknown consumer. The digital marketing profile of the unknown consumer can then be supplemented with information known about the frequent contacts.

Figure 8A:
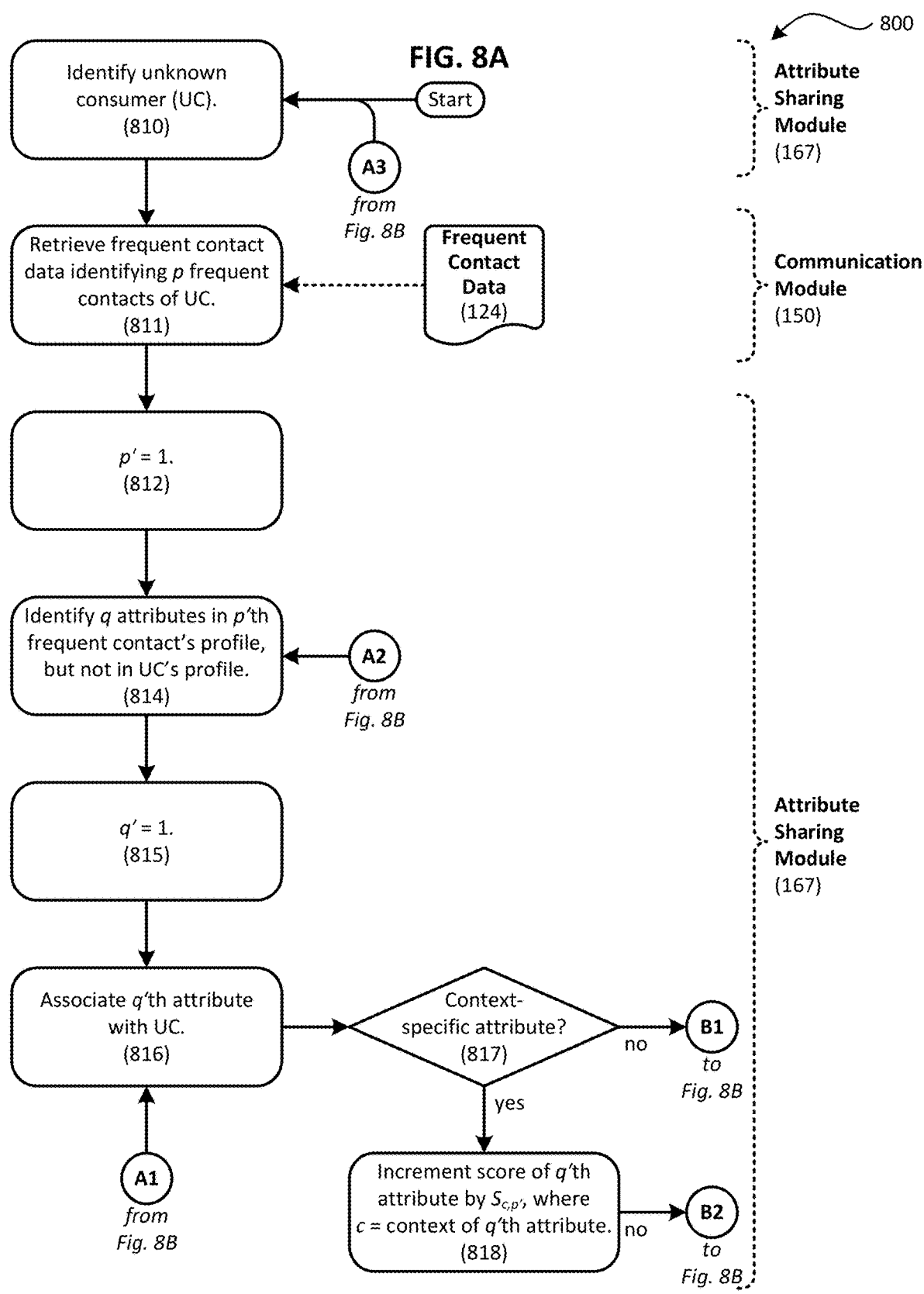

Thus in certain embodiments the consumer analytics portal is configured to identify frequent contracts of an unknown consumer. Each of these frequent contacts is assigned a proximity score that reflects the frequency and duration of contact with the unknown consumer. Profile attributes of the frequent contacts are then selectively propagated to the unknown consumer, thus providing additional insight into the unknown consumer's interests. For example, FIG. 2 illustrates that an unknown consumer 10z was observed as spending more than a threshold amount of time with consumers 10w, 10x, and 10y. Consumers 10w, 10x, and 10y are thus understood as being frequent contacts 60 of unknown consumer 10z. Consumer analytics portal 100 assigns a proximity score to each of frequent contacts 60. The proximity scores are used to selectively propagate attributes from the digital marketing profile of a frequent contact to the digital marketing profile of unknown consumer 10z. For example, if a frequent contact's profile indicates frequent travel to Kyushu, then the unknown consumer's profile can be updated to reflect possible interest in travel to Japan. In some implementations profile attributes are propagated based on the context in which the unknown consumer and the frequent contact were observed to have spent time together. For example, if unknown consumer Fred and his frequent contact Gretchen are often observed together at the baseball stadium and at the gym, then only the profile attributes associated with sports and fitness may be propagated from Gretchen to Fred in such embodiments. Additional details regarding how frequent contacts can be identified are illustrated in FIG. 7, and are described in the "Methodology: Frequent Contact Identification" subsection provided herein. Additional details regarding how profile attributes can be propagated between consumers are illustrated in FIGS. 8A and 8B, and are described in the "Methodology: Attribute Propagation" subsection provided herein.

Once the unknown consumer's digital marketing profile is appropriately supplemented, the consumer analytics portal makes this updated profile available to marketers, for example, marketers associated with the venues where the consumer interactions were initially observed. The updated profile allows the marketers to more effectively target the unknown consumers. This allows characteristics of a relatively well-known consumer to be propagated to a relatively unknown consumer on the premise that people who spend time together often share common interests, at least with respect to their mutual activities, and therefore that these relationships can form the basis for marketing attribute propagation. In some cases the characteristics of a relatively well-known consumer are propagated to a consumer having a partially complete profile with gaps which can be supplemented with data from other consumers in the consumer's circle of influence. These represent additional examples of how consumer behavioral analysis can be used to increase the efficacy of a digital marketing campaign in both online and offline contexts.

Figure 3:
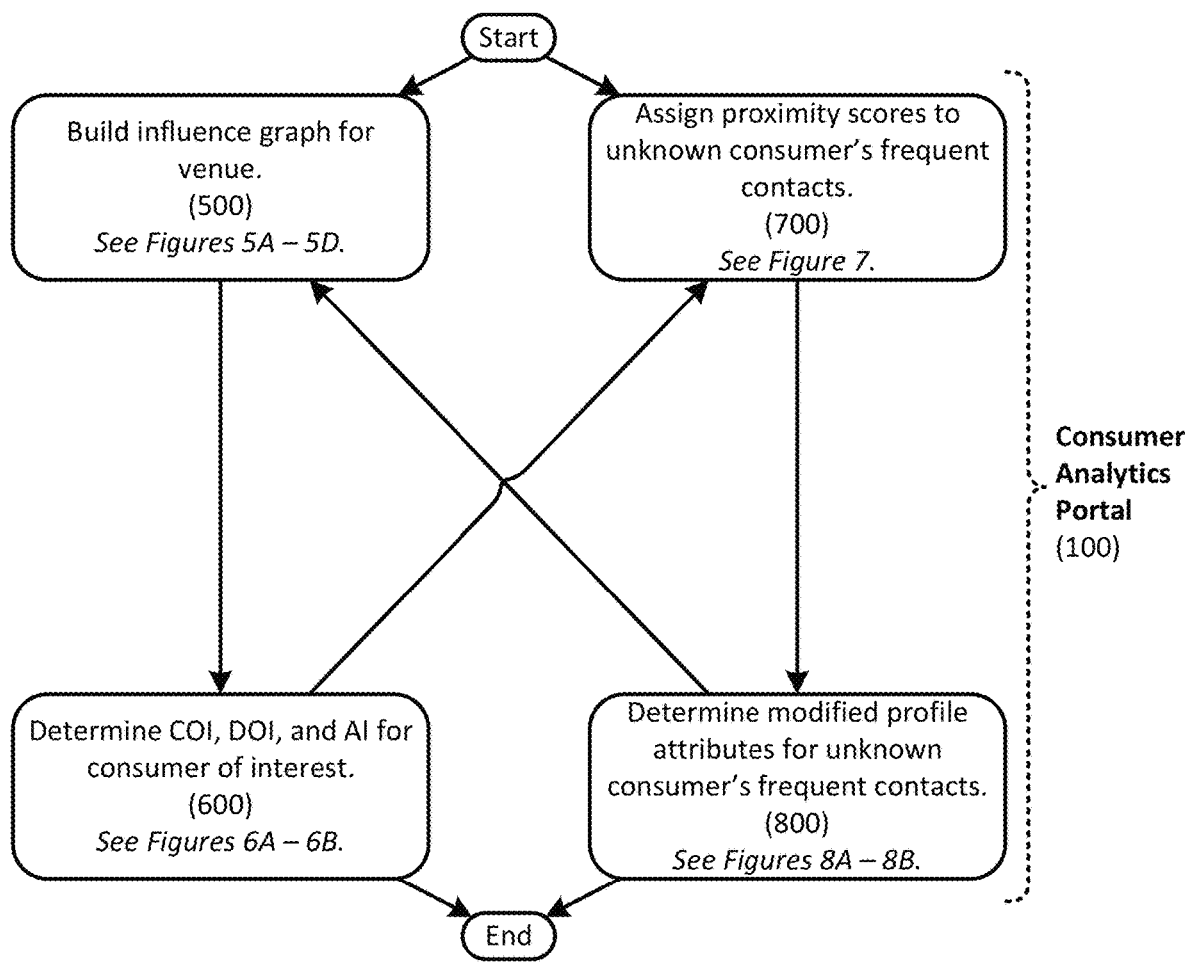
FIG. 3 is a flowchart illustrating an example method for observing consumer behavior and interactions, and for drawing inferences about how consumers can influence each other based on such observations.

The behavioral analysis workflows illustrated in FIGS. 1 and 2 can be implemented together, in combination, or separately. For example, one or more venues may enhance digital marketing efforts by targeting consumers (a) having a high aggregate influence score; (b) who may have already been influenced by another consumer; and/or (c) having profiles which were modified based on the profile of a frequent contact. Likewise, the techniques used to identify members of a circle of influence can also be used to identify frequent contacts for purposes of propagating profile attributes. These alternatives are schematically presented in FIG. 3, which illustrates an example method for observing consumer behavior and interactions, and for drawing inferences about how consumers can influence each other based on such observations. For example, in one implementation consumer analytics portal 100 builds an influence graph for a particular venue and determines a circle of influence, degree of influence scores, and/or aggregate influence scores. See reference numerals 500 and 600 in FIG. 3. In another implementation consumer analytics portal 100 assigns proximity scores to an unknown consumer's frequent contacts and determines modified profile attributes for the unknown consumer based on the assigned proximity scores. See reference numerals 700 and 800 in FIG. 3. Depending on the demands of a particular application, these behavioral analysis techniques can be implemented independently, sequentially or simultaneously.

As used herein, the term "beacon" refers broadly, in addition to its ordinary meaning, to a device capable of transmitting information to a nearby computing device. The transmitted information, which is sometimes referred to as an "advertising packet" includes identification data that allows the beacon to be uniquely identified, as well as signal strength data that allows a recipient of the information to estimate the distance to the transmitting beacon. The recipient of the advertising packet can also record a timestamp that reflects when the advertising packet was received. A beacon can therefore be used to approximate when a user has entered, exited, or lingered in a region. In one implementation the beacon transmits information using a Bluetooth wireless technology standard such as the Bluetooth low energy (BLE) protocol, and therefore such information can be received and recorded by any device capable of communicating using such a standard, including many smartphones, tablet computers, and other portable computing devices.

As used herein, the term "marketer" refers broadly, in addition to its ordinary meaning, to an originator of a marketing communication. As used herein, the term "consumer" refers broadly, in addition to its ordinary meaning, to a person who may be targeted by the marketer's efforts. A consumer may be targeted directly, for example by the marketer sending a message to the consumer, or indirectly, such as by directing the consumer to a particular department of a retail outlet. Consumers may be present in and around venues such as retail outlets, restaurants, stadiums, entertainment parks, and other locations where people spend time and interact with each other. Examples of marketers include a person or company selling products and/or services; a government official encouraging citizens to volunteer for military service; and a politician stumping for votes. Corresponding examples of consumers include potential customers who are considering making a purchase from the person or company selling the product and/or service; a citizen considering enlisting in the armed forces, and a voter deciding how to cast a ballot. It will be appreciated that both marketers and consumers may refer to individual people, groups of people, or legal organizations. For example, in some cases the term marketer may refer generally to both a seller and a person or organization that the seller has designated to organize and manage a marketing campaign on the seller's behalf.

As used herein, the term "data structure" refers broadly, in addition to its ordinary meaning, to a way of storing and organizing data in a computer accessible memory so the data can be used by an application or software module. In its simplest from, a data structure can be, for example, a set of one or more memory locations. In some cases, a data structure may be implemented as a record, sometimes referred to as a struct or tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree or hierarchical format having a number of nodes; an object format that includes data fields, for instance similar to a record; or a combination of the foregoing. A data structure may include executable code for accessing and modifying the underlying structure and format of the data stored therein. In a more general sense, the data structure may be implemented as a data set that can store specific values without being constrained to any particular order or format. In one embodiment, a data structure comprises an entry/exit table that lists times that consumers entered and exited a venue or a collection of venues. In another embodiment a data structure comprises a categorized purchase history table that lists the number of purchases an influencing consumer made in various product categories. In yet another embodiment a data structure comprises an influence table that lists the proportion of an influencing consumer's purchases which influenced the behavior of consumers in the influencing consumer's circle of interest. Numerous other data structure formats and applications will be apparent in light of this disclosure.

System Architecture

Figure 4:
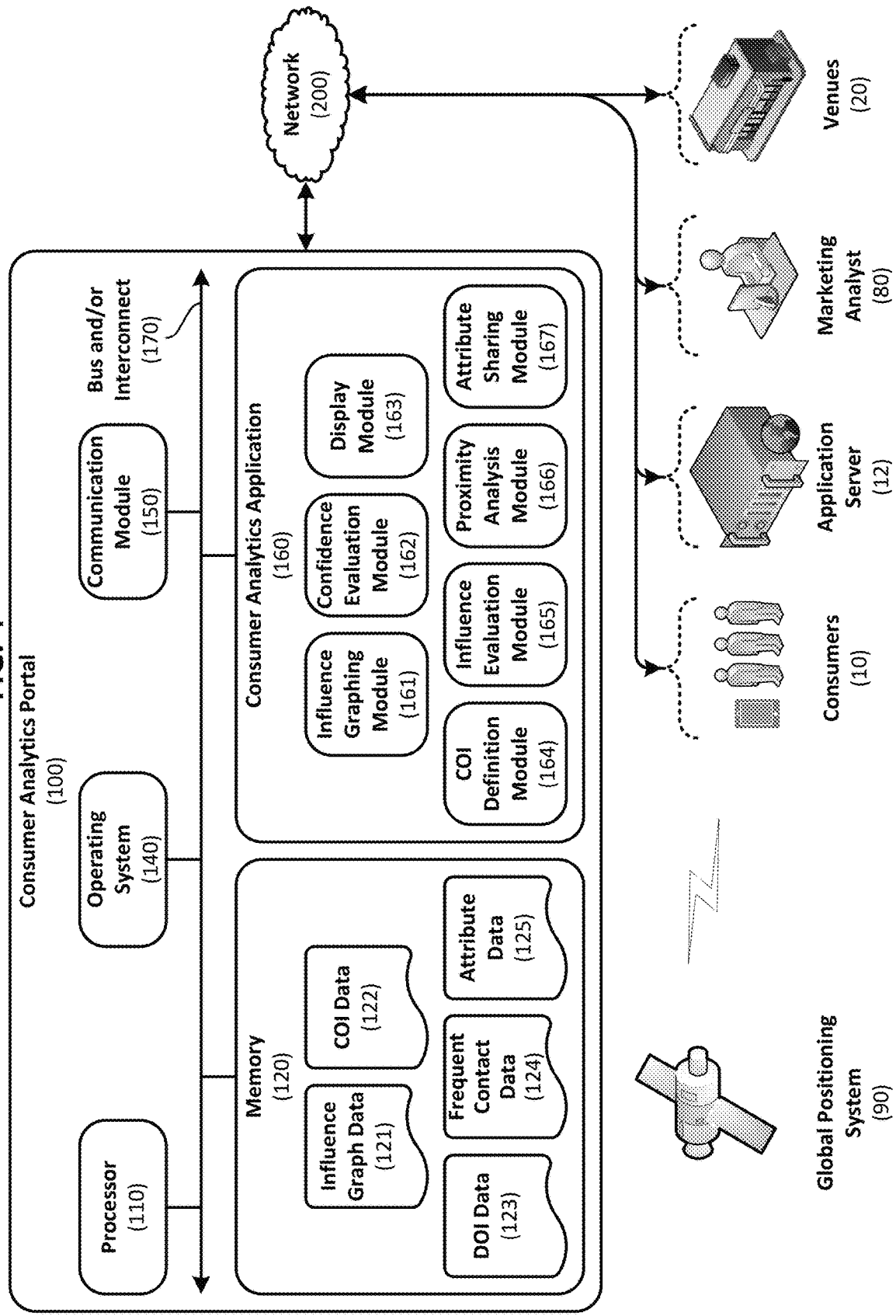
FIG. 4 is a block diagram schematically illustrating selected components and subcomponents of an example consumer analytics framework that can be used to observe consumer behavior and interactions, and to draw inferences about how consumers can influence each other based on such observations.

FIG. 4 is a block diagram schematically illustrating selected components and subcomponents of a consumer analytics framework that can be used to observe consumer behavior and interactions, and to draw inferences about how consumers can influence each other based on such observations. This framework includes the previously-discussed consumer analytics portal 100, which may comprise, for example, one or more devices selected from a desktop computer, a laptop computer, a workstation, a tablet computer, a smartphone, a handheld computer, a set-top box, an enterprise class server, or any other such computing device. A combination of different devices may be used in certain embodiments. In the illustrated embodiment, portal 100 includes, among other things, a processor 110, a memory 120, an operating system 140, a communication module 150, and a consumer analytics application 160. Portal 100 is coupled to a network 200 to allow for communication with other computing devices and entities, such as the aforementioned consumers 10 and venues 20. Other embodiments may have fewer or more networks, communication paths, subcomponents, and/or resources, depending on the granularity of implementation.

In certain implementations consumer analytics portal 100 is configured to communicate with a smartphone or other portable computing device that is carried by one of consumers 10. This allows portal 100 to acquire data that is collected by one or more mobile applications running on the portable device. One example of such data is consumer interaction data that characterizes transmissions received from beacons in venue 20. Such data may be aggregated as consumer 10 moves about venue 20 while carrying a smartphone. Transmissions received from multiple beacons, when supplemented with signal strength data, allows a consumer's location to be estimated within a few inches. Another example of such data is geolocation data collected in response to signals received from, for example, a global positioning system 90. Yet another example of such data is mobile application data that characterizes consumer interactions with a mobile application associated with venue 20, such as an online shopping application. In a modified embodiment the consumer interaction data and/or other observational data is sent from the mobile application to an application server 12, in which case portal 100 is configured to retrieve such data from application server 12. Regardless of whether data is acquired directly from consumers 10 or from an intermediate application server 12, it will be appreciated that consumer analytics portal 100 is capable of receiving a wide variety of observational data originating from a range of different sources.

As a consumer moves amongst various beacons deployed at different locations throughout a venue, the beacon transmissions are received by the consumer's portable computing device. In one implementation, an application that is associated with the venue is left executing in the background operating environment of the consumer's device. The application detects transmissions from nearby beacons, even if those beacons are not registered with the application. While such an implementation can reliability detect transmissions even from unregistered beacons, as a practical matter consumers are often hesitant to leave an application executing in the device background because of concerns associated with security, device performance, and battery performance. In addition, consumers often perceive that such applications are not critical, and thus prevent such applications from background execution. In view of these concerns, an alternative way of receiving beacon transmissions is to register a known set of beacons with the device operating system. The operating system can then wake the venue-specific application in response to detecting a transmission from a registered beacon. This eliminates any need to maintain an application executing in the device background operating environment. Such an implementation may be useful for mobile applications that are associated with a particular venue. For example, a retailer can configure its mobile application to register with the portable device operating system for notifications from all of the retailer's known beacons. But such an implementation still requires the application associated with the venue to be installed on the consumer's portable computing device. This makes it difficult to track consumers who visit a venue infrequently, or who otherwise have not felt the need to install a venue-specific application. Another drawback of this scenario is that once the consumer leaves the retailer's venue, transmissions from unregistered beacons will not be recorded.

In an improved implementation, an application that continually looks for transmissions from any mobile beacon is left executing in the device background. In such an implementation the application provides some other functionality that users are likely to perceive as having a higher degree of criticality, such as a weather application that provides forecasts and alerts, a sports application that provides real-time scores and news, or any other similar application or set of applications, such as any of a number of games or social networking applications. The provider of such an application can configure the application to collect beacon transmissions form a large number of venues, and then sell the collected transmission data to the venues. This allows the application provider to generate a revenue stream from an application that, from the consumer's perspective, is free to acquire and use. It also may alleviate a need for the application provider to sell and display advertisements to users of the application, thus improving user experience. In some cases an application provider may pay a venue for beacon placement, thereby generating more robust consumer observation data. In other implementations a venue that wishes to access consumer observation data collected by an application would be required to reciprocate by providing beacon placement within the venue, again to allow the application provider to generate more robust consumer observation data. Thus it will be appreciated that there are a wide variety of ways to incentivize beacon placement within venues. In any case, incorporating the collection of beacon transmissions into a widely distributed and used application allows a marketing analyst to gather information derived from a larger consumer population. Likewise, certain of the embodiments disclosed herein provide a method of monetizing a background-executing mobile application that collects consumer observation data based on beacon transmissions.

In some implementations venue 20 is associated with a web server or mobile application service provider, in which case application server 12 can be configured to service requests from a website or a mobile application. In such implementations consumer analytics portal 100 can be configured to retrieve consumer tracking data generated by application server 12 itself. Such consumer tracking data may, for example, characterize consumer interactions with an online storefront associated with venue 20. This provides yet another way to observe the activities of consumers 10, and is particularly useful where members of a circle of influence are monitored to better understand how they respond, if at all, to a purchase made by an influencing consumer. For example, if a member of a circle of influence accesses an online storefront associated with venue 20 shortly after the influencing consumer makes a purchase from venue 20, this activity can accurately be associated with the influencing consumer. In some cases consumer analytics portal 100 is configured to communicate with venue 20 and/or a marketing analyst 80 associated with venue 20 to receive supplemental data that further characterizes consumer activity. One example of such supplemental data is payment information. For instance, the sharing of a payment card between two consumers can be taken as an indication that the consumers are closely related.

The communications with venue 20 and/or associated marketing analyst 80 also include communications of analytics data generated by portal 100, such as data characterizing influence graphs, circles of influence, degree of influence scores, and/or aggregate influence scores. In some cases such data is transmitted directly to venue 20, while in other cases it is transmitted to analyst 80 who generates a marketing strategy based on such analytics. In an alternative embodiment portal 100 includes modules and interfaces that facilitate the creation of a marketing strategy. Such a marketing strategy may include, for example, targeted communications, identification of particular consumers who are likely to be interested in the products and/or services offered at venue 20, or alerts indicating shopping habits associated with an influential consumer. Such strategic information and insights can transmitted directly to venue 20.

Referring still to the example consumer analytics framework illustrated in FIG. 4, processor 110 can be any suitable processor, and many include one or more coprocessors or controllers, such as an audio processor or a graphics processing unit, to assist in processing operations of consumer analytics portal 100. Memory 120 can be implemented using any suitable type of digital storage, such as one or more of a disk drive, a universal serial bus drive, flash memory, and random access memory. Operating system 140 may comprise any suitable operating system, such as Google Android (Google Inc., Mountain View, Calif.), Microsoft Windows (Microsoft Corp., Redmond, Wash.), Apple iOS (Apple Inc., Cupertino, Calif.), or Apple OS X (Apple Inc., Cupertino, Calif.). As will be appreciated in light of this disclosure, the techniques provided herein can be implemented without regard to the particular operating system provided in conjunction with consumer analytics portal 100, and therefore may also be implemented using any suitable existing or subsequently developed platform. Communication module 150 can be any appropriate network chip or chipset which allows for wired and/or wireless communication via network 200 to external entities and resources such as consumers 10 and venues 20. A bus and/or interconnect 170 is also provided to allow for inter- and intra-device communications using, for example, communication module 150.

Memory 120 can be used to store analytical data that marketers can leverage to more effectively target consumers. For example, in certain embodiments memory 120 stores influence graph data 121 that defines nodes, connecting edges, and confidence levels that collectively represent links between observed consumers. Influence graph data 121 can be used to generate an influence graph, such as illustrated in FIG. 1. Memory 120 also optionally stores circle of influence data 122 that defines a circle of influence for a particular influencing consumer. Circle of influence data 122 can be used to identify consumers over which a particular influencing consumer wields some degree of influence. In some embodiments memory 120 stores degree of influence data 123 that defines how much influence an influencing consumer has over members of his/her circle of influence. In some cases degree of influence data 123 is refined based on different product categories. This is because a particular influencing consumer may exert significant influence over a particular consumer's purchasing decisions in one product category, but may exert little or no influence in another product category. To this end, degree of influence data 123 may include, for example, a categorized purchase history table for an influencing consumer and an influence table for members of the influencing consumer's circle of influence. Additional details regarding the categorized purchase history table and the influence table will be described in turn.

Memory can also be used to store analytical data that facilitates the process of modifying a marketing profile of a relatively unknown consumer based on marketing profile attributes of one or more frequent contacts of the relatively unknown consumer. For example, in certain embodiments memory 120 stores frequent contact data 124 that identifies consumers with whom a relatively unknown consumer often spends time. Each frequent contact is optionally associated with a proximity score that reflects the level of contact with the relatively unknown consumer. In some cases the proximity score is refined based on different product categories in recognition of the fact that two consumers may often spend time together in a setting that is associated with a particular product category. Memory 120 also optionally stores attribute data 125 that defines a digital marketing profile for a consumer. Attribute data 125 can be used to associate a consumer with one or more market segments, and can therefore allow the consumer to be more effectively targeted as part of a marketing campaign.

Consumer analytics application 160 comprises any suitable computer software application that provides predictive and/or real-time analytics for a marketing campaign that includes offline components. In particular, the analytical tools provided by consumer analytics application 160 provide marketers with insights that guide decisions for marketing investment and consumer targeting. In general, consumer analytics application 160 can be understood as enabling marketers to personalize content and marketing communications in real-time in response to detected conditions. In one embodiment consumer analytics application 160 exposes an interface through which an analyst can view an influence graph, a consumer's circle of influence, updated digital marketing profiles, and other data generated using the various embodiments disclosed herein. Examples of commercially available consumer analytics applications include Google Analytics (Google, Inc., Mountain View, Calif.) and Adobe Marketing Cloud (Adobe Systems Incorporated, San Jose, Calif.). In certain embodiments consumer analytics application 160 is installed local to a computer system, while in alternative embodiments it is remotely provided using an applet, such as a JavaScript applet, or other downloadable module. In still other embodiments it may be provided as a service, such as an Internet cloud application.

Still referring to the example embodiment illustrated in FIG. 4, consumer analytics application 160 includes modules configured to invoke functionality that enables marketers to better understand how consumers influence each other. Such modules include an influence graphing module 161 and a confidence evaluation module 162. Influence graphing module 161 comprises instructions encoded on a computer readable medium that, when executed using a processor, cause an influence graphing process to be invoked. The influence graphing process generates an influence graph that includes nodes linked by connecting edges, wherein the linked nodes represent consumers who have been observed as spending a threshold amount of time together, and in one particular embodiment, entering and exiting a venue together on multiple occasions. Confidence evaluation module 162 comprises instructions encoded on a computer readable medium that, when executed using a processor, cause a confidence evaluation process to be invoked. The confidence evaluation process determines a confidence level that is associated with an edge in the influence graph, and that is therefore also associated with the link between the two linked consumers. In certain embodiments, the confidence level is based on the amount of time the consumers are observed as spending together, both inside and outside an analyzed venue. In some cases the confidence level is further based on observations about how the consumers have shared payment obligations while at the analyzed venue. Consumer analytics application 160 optionally includes a display module 163 that is capable of displaying an influence graph generated based on analytics produced by the influence graphing and confidence evaluation processes.

Other modules which may also be provided by consumer analytics application 160 include a circle of influence definition module 164 and an influence evaluation module 165. Circle of influence definition module 164 comprises instructions encoded on a computer readable medium that, when executed using a processor, cause a circle of influence definition process to be carried out. The circle of influence definition process identifies consumers represented by nodes which are directly linked by an edge in the influence graph. All of the consumers who are directly linked to a particular influencing consumer can be considered as defining the influencing consumer's circle of influence. Influence evaluation module 165 comprises instructions encoded on a computer readable medium that, when executed using a processor, cause an influence evaluation process to be carried out. The influence evaluation process determines a degree of influence for each of the consumers in the circle of influence, wherein the degree of influence defines how much influence the influencing consumer has over individual members of his/her circle of influence. In one embodiment, the degree of influence is based on the proportion of the influencing consumer's purchases that influenced the behavior of consumers in the circle of influence. The degree of influence is optionally refined based on different product categories.

Still other modules which may also be provided by consumer analytics application 160 include a proximity analysis module 166 and an attribute sharing module 167. Proximity analysis module 166 comprises instructions encoded on a computer readable medium that, when executed using a processor, cause a frequent contact identification process to be invoked. The frequent contact identification process identifies frequent contacts of a particular consumer of interest. The frequent contacts are defined as those consumers who have spent a threshold amount of time with the consumer of interest on multiple occasions within a particular timeframe. The frequent contact identification process is capable of associating each identified frequent contact with a proximity score that quantifies how close the relationship is between the consumer of interest and an identified frequent contact. In some cases the proximity score is refined based on different product categories in recognition of the fact that two consumers may often spend time together in a setting that is associated with a particular product category. Attribute sharing module 167 comprises instructions encoded on a computer readable medium that, when executed using a processor, cause an attribute propagation process to be invoked. The attribute propagation process selectively propagates attributes from a frequent contact's digital marketing profile to a relatively unknown consumer's profile. The profile attributes are propagated based on the aforementioned proximity scores that are generated by proximity analysis module 166. In general, profile attributes are more easily propagated between consumers having proximity scores that indicate a relatively close relationship.

Consumer analytics portal 100 can communicate with the various networked resources and entities described herein via network 200. Network 200 may be a local area network (such as a home-based or office network), a wide area network (such as the Internet), a peer-to-peer network (such as a Bluetooth connection), or a combination of such networks, whether public, private, or both. For example, in certain embodiments at least a portion of the functionality associated with network 200 is provided by a cellular data network, thereby making it easier for users of smartphones and tablet computers to leverage networked resources. In general, communications amongst the various entities and resources described herein may occur via wired and/or wireless connections, such as may be provided by Wi-Fi or mobile data networks. In some cases access to resources on a given network or computing system may require credentials such as a username and password, and/or may require compliance with any other suitable security mechanism.

The embodiments described herein can be implemented in various forms of hardware, software, firmware, and/or special purpose processors. For example, in one embodiment a non-transitory computer readable medium has instructions encoded thereon that, when executed by one or more processors, cause one or more of the behavioral analysis methodologies described herein to be implemented. The instructions can be encoded using any suitable programming language, such as C, C++, object-oriented C, JavaScript, Visual Basic .NET, BASIC, Scala, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into a variety of different software applications, including marketing campaign management applications and targeted content delivery applications. The functionalities disclosed herein can additionally or alternatively leverage services provided by separate software applications, such as sentiment analysis applications. The computer software applications disclosed herein may include a number of different modules, sub-modules, or other components of distinct functionality, and can provide information to, or receive information from, still other components and services. These modules can be used, for example, to communicate with input and/or output devices such as a display screen, a touch sensitive surface, a printer, and/or any other suitable input/output device. Other components and functionality not reflected in the illustrations will be apparent in light of this disclosure, and it will be appreciated that the present disclosure is not intended to be limited to any particular hardware or software configuration. Thus in other embodiments the components illustrated in FIG. 4 may include additional, fewer, or alternative subcomponents.

The aforementioned non-transitory computer readable medium may be any suitable medium for storing digital information, such as a hard drive, a server, a flash memory, and/or random access memory. In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and/or firmware can be used, and that the present disclosure is not intended to be limited to any particular system architecture.

Methodology: Influence Graphing

FIGS. 5A through 5D comprise a flowchart illustrating an example influence graphing method 500 for building an influence graph that shows how consumers who have spent time together can influence each other. As can be seen, method 500 includes a number of phases and sub-processes, the sequence of which may vary from one embodiment to another. However, when considered in the aggregate, these phases and sub-processes form part of an improved behavioral analysis framework that is capable of building an influence graph that shows how consumers who have spent time together can influence each other. Method 500 is responsive to user input and detected consumer behaviors in accordance with certain of the embodiments described herein. Method 500 can be implemented, for example, using consumer analytics portal 100 illustrated in FIG. 4 and described herein. However other systems can be used in other embodiments, as will be apparent in light of this disclosure. To this end, the correlation of the various functionalities shown in FIGS. 5A through 5D to the specific components illustrated in FIG. 4 is not intended to imply any structural and/or use limitations. Rather, other embodiments may include, for example, varying degrees of integration wherein multiple functionalities are effectively performed by one system or module. For example, in an alternative embodiment a single module is used to build an influence graph and evaluate confidence in the edges that are included in the influence graph. Thus other embodiments may have fewer or more modules depending on the granularity of implementation. Numerous variations and alternative configurations will be apparent in light of this disclosure. FIG. 9 is a table summarizing the consumer analytics parameters used in certain implementations of influence graphing method 500.

Figure 5A:
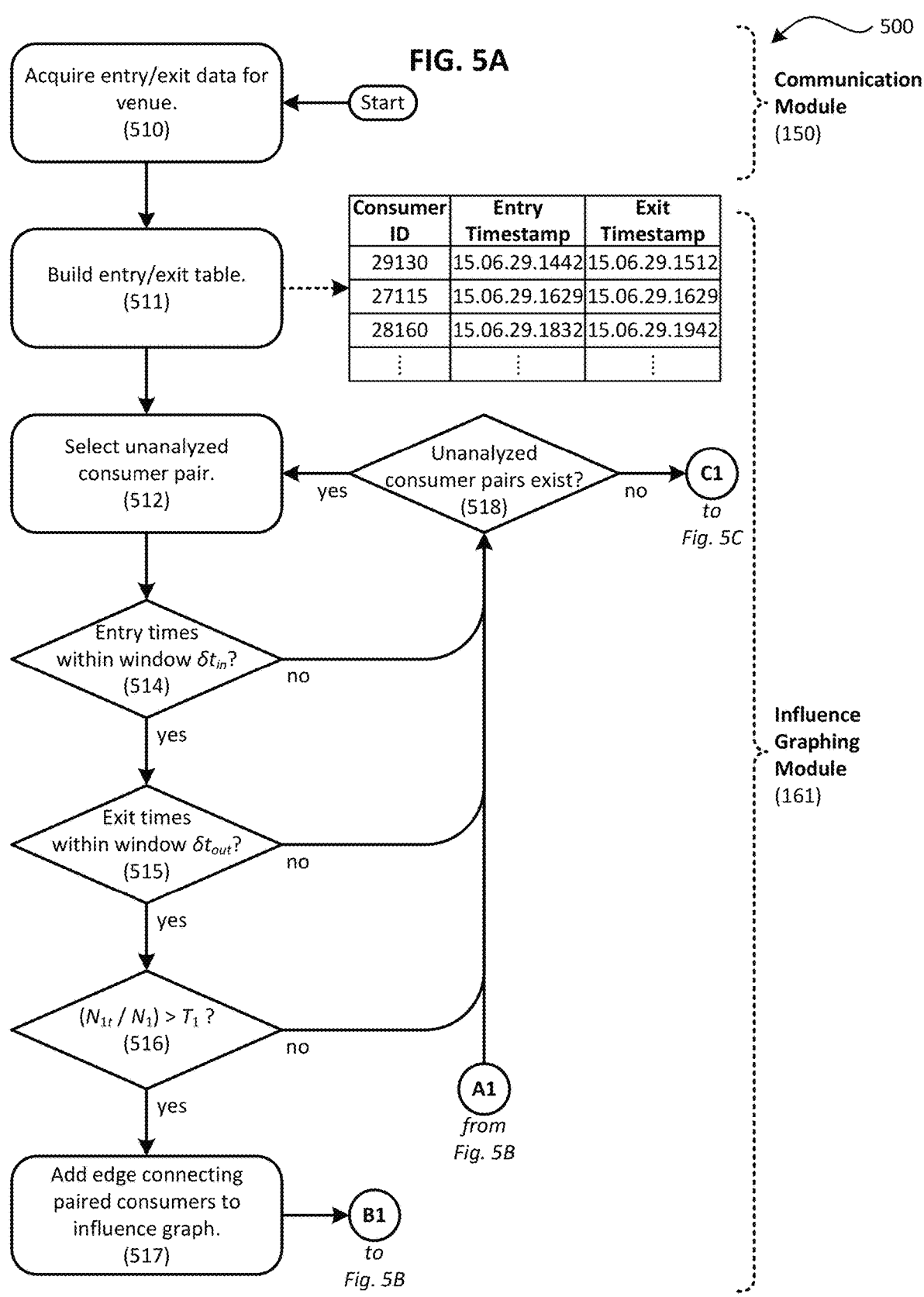

As illustrated in FIG. 5A, method 500 commences with using communication module 150 to acquire entry/exit data for a venue. See reference number 510 in FIG. 5A. One way of collecting entry/exit data for a venue includes positioning beacons near the venue entrances and exits. As a consumer carries his/her portable computing device through the entry/exit points, an application executing on the device receives an advertising packet from the beacon and records a beacon identifier along with a timestamp indicating when the advertising packet was received. This data can later be passed to consumer analytics application 160. As large numbers of consumers enter and exit the venue over a period of several days, weeks, or months, a correspondingly large quantity of entry/exit data can be acquired. The influence graphing process invoked by influence graphing module 161 can build an entry/exit table based on the acquired entry/exit data. See reference numeral 511 in FIG. 5A. As illustrated, in one embodiment the entry/exit table lists entry and exit timestamps for a particular consumer at a particular venue. In some cases the consumer is identified by a mobile device identifier associated with his/her portable computing device. In other implementations the consumer is identified using a hypertext transfer protocol (HTTP) subscriber identifier header that includes a unique identifier such as a phone number, a hashed version of a phone number, or some other identifier that uniquely identifies the device and therefore the consumer.

In some cases two or more consumers may have entered and/or exited a venue at substantially the same time. These paired entries can be identified by reviewing the entry/exit table for pairs of consumers having similar entry/exit times. This can be done quickly by sorting the table by entry or exit time. Once the table is sorted in this way, adjacent rows of the table represent consumer pairs that can be analyzed. In some cases, where more than two consumers entered or exited the venue within a short time period, rows of the table that are not immediately adjacent to each other can be analyzed as well. In either case, the influence graphing process invoked by influence graphing module 161 selects a previously unanalyzed consumer pair for analysis. See reference numeral 512 in FIG. 5A. The two entry times for the consumer pair are compared to determine if they are within a time window $\delta t_{in}$, which represents a maximum entry time difference beyond which the two consumers are taken to have come to the venue separately. See reference numeral 514 in FIG. 5A. Example values for $\delta t_{in}$ are 15 seconds, 30 seconds, 45 seconds, and 1 minute, although other values, including intermediate values, can be used in other embodiments. If the two entry times are within $\delta t_{in}$, then the corresponding two exit times are compared to determine if they are within a time window $\delta t_{out}$, which represents a maximum exit time difference beyond which the two consumers are taken to have left the venue separately. See reference numeral 515 in FIG. 5A. Example values for $\delta t_{out}$ are 15 seconds, 30 seconds, 45 seconds, and 1 minute, although other values, including intermediate values, can be used in other embodiments. If the two entry times are not within $\delta t_{in}$, or the two exit times are not within $\delta t_{out}$, then the two consumers are taken to have entered or exited the venue separately. In an alternative embodiment the time windows $\delta t_{in}$ and $\delta t_{out}$ are correlated to the frequency of observation, such that consumers who enter and exit a venue simultaneously are taken to have visited the venue together after a relatively small number of such observations, whereas consumers who enter and exit a venue with a larger temporal separation are taken to have visited the venue together only after a relatively large number of such observations. In either case, the entry/exit table is analyzed to determine whether additional unanalyzed consumer pairs exist. See reference numeral 518 in FIG. 5A. If so, the entry and exit times of the next pair of consumers are analyzed similarly.

If the entry and exit times for a particular consumer pair are within the respective time windows $\delta t_{in}$ and $\delta t_{out}$, the consumers' previous visits to the venue are further analyzed. In particular, the entry/exit table is reviewed to identify the most recent $N_1$ instances when the two consumers visited the venue on the same day. Example values for $N_1$ are 2 visits, 3 visits, 4 visits, 5 visits, 8 visits, and 10 visits, although other values, including intermediate values, can be used in other embodiments. Of these $N_1$ previous same-day visits, the number of visits that have entry and exit times within the $\delta t_{in}$ and $\delta t_{out}$ thresholds, respectively, are counted. This value is $N_{it}$. The ratio $(N_1 \div N_{it})$ is compared to a threshold value $T_1$. See reference numeral 516 in FIG. 5A. If $(N_1 \div N_{1t}) > T_1$, then the two consumers are considered as influencing each other, and nodes connected by an edge representing the two linked consumers are added to an influence graph associated with the venue. See reference numeral 517 in FIG. 5A. The confidence evaluation process invoked by confidence evaluation module 162 associates the edge connecting these two consumers with a High confidence level. See reference numeral 520 in FIG. 5B. If $(N_1 \div N_{1t}) \leq T_1$, then the two consumers are not understood as influencing each other. In this case, the entry/exit table is analyzed to determine whether additional unanalyzed consumer pairs exist. See reference numeral 518 in FIG. 5A. If so, the entry and exit times of the next pair of consumers are analyzed similarly. Example values for the threshold time parameter $T_1$ are 5%, 10%, 15%, and 20%, although other values, including intermediate values, can be used in other embodiments.

Once all relevant consumer pairs in entry/exit table have been adequately analyzed, the confidence in the linked consumers' relationship is further evaluated using geolocation data. This allows consumer activity to be monitored outside the venue. For example, if it is observed that consumers frequently exercise, go hiking, or otherwise spend time together outdoors, this can increase the level of confidence in a previously established relationship between the consumers. The confidence evaluation process invoked by confidence evaluation module 162 selects a previously unanalyzed edge in the influence graph for further analysis. See reference numeral 530 in FIG. 5C. Communication module 150 acquires $N_2$ samples of geolocation data from the two consumers who are linked by the selected edge. See reference numeral 531 in FIG. 5C. Example values for the number of collected samples $N_2$ are 10 samples, 50 samples, 100 samples, 500 samples, 1000 samples, 5000 samples, and 10000 samples, although other values, including intermediate values, can be used in other embodiments. The geolocation data can be acquired from an application executing on a portable computing device carried by each of the linked consumers. Of the $N_2$ geolocation data samples, the number of samples that are within a threshold distance $\delta d$ counted. This value is $N_{2d}$. Example values for the threshold distance $\delta d$ are 50 cm, 1 meter, 2 meters, 5 meters, and 10 meters, although other values, including intermediate values, can be used in other embodiments. The ratio $(N_{2d} \div N_2)$ is compared to a threshold value $T_2$. See reference numeral 532 in FIG. 5C. If $(N_{2d} \div N_2) > T_2$, then the confidence evaluation process invoked by confidence evaluation module 162 sets the confidence level for the analyzed edge to Super High. See reference numeral 533 in FIG. 5C. Otherwise, if $(N_{2d} \div N_2) \leq T_2$, the confidence level remains at the previously set High level. Example values for the threshold distance parameter $T_2$ are 10%, 20%, 25%, 30%, 33%, and 40%, although other values, including intermediate values, can be used in other embodiments.

In other embodiments a total number of samples that are within a threshold distance are used to determine whether the confidence level should be enhanced to Super High. For example, in such embodiments if $N_{2d} \geq T_{2d}$, then the confidence evaluation process invoked by confidence evaluation module 162 sets the confidence level for the analyzed edge to Super High. In this context, $T_{2d}$ is a threshold quantity of samples for a Super High confidence enhancement. Examples values for the threshold quantity $T_{2d}$ are 2, 5, 10, 20, 100, 300, and 500, although other values, including intermediate values, can be used in other embodiments. In still other embodiments a more substantial confidence enhancement is invoked if consumers are observed together at a relatively large number of locations, as compared to if consumers are observed together at a relatively small number of locations. For example, complete strangers may hold adjacent season tickets and be observed together at the baseball stadium five or six times per week, while close friends may be observed at one baseball game, two restaurants, and a store over the course of a week. In this case, the close friends would be linked with a higher degree of confidence than the adjacent season ticket holders.

The confidence in the linked consumers' relationship can be further evaluated based on observations of the linked consumers' activity within the venue, including information about how the linked consumers spent time together at the venue or paid for a completed transaction. Communication module 150 is thus used to acquire in-venue location and payment data from the venue. See reference numeral 540 in FIG. 5D. One way of collecting in-venue location data includes positioning beacons at various locations throughout the venue. As a consumer carries his/her portable computing device around the venue, an application executing on the device receives advertising packets from the beacons and records beacon identifiers along with a timestamp indicating when the advertising packet was received. In some implementations beacons are placed on a shopping cart, and thus two consumers walking together with the shopping cart can be understood as having shopped together. Thus in certain embodiments acquiring in-venue location data comprises making a determination that two consumers shared a shopping cart as they moved about a venue. In other types of venues, beacons can be similarly positioned so as to facilitate observation of consumers spending time together. For example, a beacon placed in a seating section of a sports or entertainment venue can be used to observe two consumers sitting together. Or a beacon placed at a restaurant can be used to observe two consumers dining together. Observations such as these are facilitated by the fact that beacons transmit signal strength data that allows the recipient to estimate a distance to the transmitting beacon. Thus two consumers who have observed a common beacon within a similar distance can be assumed to be together in substantially the same location.

Information about how the consumers paid for a completed transaction may be acquired directly from the venue itself. In some cases consumer analytics application 160 is configured to link location observations with payment information. For example, and as noted above, placing beacons on shopping carts allows a particular shopping cart to be associated with a particular consumer. If a single credit card is used to pay for goods in two different shopping carts, it can be assumed that two consumers have shared a payment method. The link between the credit card payments and the shared shopping carts can be established by linking timestamps associated with the payments (acquired from the venue) with timestamps of advertising packets received from shopping cart beacons and checkout register beacons recorded by the consumers' portable computing devices. A similar technique can be used to observe that two consumers present at the same restaurant table used a single credit card to pay for their meal.

Using observational data such as described herein, the confidence evaluation process invoked by confidence evaluation module 162 makes a determination with respect to whether the linked consumers have spent more than a threshold amount of time $T_3$ together at the venue. See reference numeral 541 in FIG. 5D. Example values for the time threshold $T_3$ are 10 seconds, 30 seconds, 1 minute, 3 minutes, and 5 minutes, although other values, including intermediate values, can be used in other embodiments. In the context of a retail establishment, determining whether the consumers have spent substantial time together can be accomplished by observing that the two consumers were together with a common shopping cart for more than the threshold amount of time $T_3$. In the context of a sports or entertainment venue, this can be accomplished by observing that the two consumers were present in the same seating section for more than the threshold amount of time $T_3$. If the linked consumers were observed to have spent more than the threshold amount of time $T_3$ together at the venue, for example by sharing a shopping cart or sitting together at a restaurant table, then the confidence evaluation process invoked by confidence evaluation module 162 sets the confidence level for the analyzed edge to Ultra High. See reference numeral 543 in FIG. 5D. Likewise, if the linked consumers were observed to have shared payment at the venue, the confidence level for the analyzed edge can also be set to Ultra High. See reference numerals 542 and 543 in FIG. 5D.

In certain embodiments, all of the edges in the influence graph are analyzed to determine whether the corresponding confidence level should be enhanced to Super High (for example, based on geolocation obligations) or Ultra High (for example, based on in-venue location or payment observations). The influence graph is therefore analyzed to determine whether additional unanalyzed edges exist. See reference numeral 544 in FIG. 5D. If so, they are analyzed as disclosed herein. If all of the edges in the influence graph have been analyzed and associated with an appropriate confidence level, communication module 150 saves influence graph data 121 in memory 120, wherein influence graph data 121 represents the structure of the influence graph and the confidence levels of the edges. See reference numeral 545 in FIG. 5D. Influence graph data 121 is optionally sent to the venue or an analyst associated with the venue, thus providing a more thorough understanding of the consumers who visit the venue. See reference numeral 546 in FIG. 5D. In some cases influence graph data 121 is provided to circle of influence definition module 164, where it can be used to define a circle of influence for the venue. The influence graph is optionally rendered using display module 163. See reference number 547 in FIG. 5D. For example, the influence graph can be displayed using hardware associated with consumer analytics portal 100, and/or using hardware available to a remotely located analyst, such as an analyst associated with the venue.

Methodology: Influence Evaluation

FIGS. 6A and 6B comprise a flowchart illustrating an example influence evaluation method 600 for determining a circle of influence for an influencing consumer, the degree to which the influencing consumer influences other consumers in the circle of influence, and the aggregate influence wielded by the influencing consumer. As can be seen, method 600 includes a number of phases and sub-processes, the sequence of which may vary from one embodiment to another. However, when considered in the aggregate, these phases and sub-processes form part of an improved behavioral analysis framework that is capable of determining a circle of influence for an influencing consumer, the degree to which the influencing consumer influences other consumers in the circle of influence, and the aggregate influence wielded by the influencing consumer. Method 600 is responsive to user input and detected consumer behaviors in accordance with certain of the embodiments disclosed herein. Method 600 can be implemented, for example, using consumer analytics portal 100 illustrated in FIG. 4 and described herein. However other systems can be used in other embodiments, as will be apparent in light of this disclosure. To this end, the correlation of the various functionalities shown in FIGS. 6A and 6B to the specific components illustrated in FIG. 4 is not intended to imply any structural and/or use limitations. Rather, other embodiments may include, for example, varying degrees of integration wherein multiple functionalities are effectively performed by one system or module. For example, in an alternative embodiment a single module is used to define a circle of influence for an influencing consumer and evaluate how much influence the influencing consumer has over individual members of the circle of influence. Thus other embodiments may have fewer or more modules depending on the granularity of implementation.

As illustrated in FIG. 6A, method 600 commences with using communication module 150 to retrieve influence graph data 121 from memory 120. See reference numeral 610 in FIG. 6A. A particular consumer of interest is selected for detailed analysis. See reference numeral 611 in FIG. 6A. The identified consumer of interest can be understood as an "influencing consumer" because the extent to which that consumer influences other consumers will be evaluated. Any of the nodes in the influence graph can be selected as the influencing consumer, and thus the influence evaluation method 600 can be performed for multiple consumers whose influence is to be evaluated. In one implementation the influencing consumer is identified based on user input, while in other embodiments an automated process sequentially evaluates the influence of each consumer represented in the influence graph. Once the influencing consumer has been identified, the circle of influence definition process invoked by circle of influence definition module 164 defines a circle of influence based on those consumers who are directly connected to the influencing consumer by an edge in the influence graph. See reference numeral 612 in FIG. 6A. Circle of influence data 122 that represents the influencing consumer's circle of influence is optionally saved in memory 120.

Communication module 150 is configured to acquire purchase history data for the influencing consumer. See reference numeral 614 in FIG. 6A. In one embodiment this purchase history data is acquired directly from the venue. The influence evaluation process invoked by influence evaluation module 165 can build a categorized purchase history table based on the acquired purchase history data. See reference numeral 615 in FIG. 6A. As illustrated, in one embodiment the categorized purchase history table lists the number of purchases the influencing consumer made in particular product categories. Communication module 150 is also configured to acquire activity history data for consumers in the influencing consumer's circle of influence. See reference numeral 616 in FIG. 6A. As used herein, "activity history" is understood as encompassing and having a broader scope than "purchase history", and thus activity history may be understood to include not only purchases, but also other product interactions such as a visit to a retail outlet associated with a particular venue, use of a mobile application associated with a particular venue, or a visit to a website associated with a particular venue. Activity history can be acquired from a number of different sources, such as from a purchase history acquired from a venue (used to identify purchases); a log of observed beacons maintained on a consumer's portable computing device (used to identify visits to a retail outlet); a log of observed activity acquired from an application server (used to identify use of a mobile application); and browsing history acquired directly or indirectly from a computing device associated with the consumer (used to identify visits to a webpage). In certain embodiments each of the various events reflected in the activity history is associated with a timestamp corresponding to the time when the activity occurred.

Once the purchase history for the influencing consumer and the activity history for the consumers in the circle of influence are acquired, the influence evaluation process invoked by influence evaluation module 165 determines how many of the influencing consumer's purchases were observed to have influenced the activity of consumers in the circle of influence. See reference numeral 617 in FIG. 6A. These observations can be recorded in an influence table which is built by the influence evaluation process. See reference numeral 620 in FIG. 6B. These observations can be made and recoded by iteratively reviewing the activity of a consumer in the circle of influence, and evaluating how this activity temporally relates to the purchases made by the influencing consumer. These temporal relationships can be segmented by product category, thus allowing the influencing consumer's influence to be separately evaluated for different product categories and different consumers. In certain implementations, consumers who were with the influencing consumer when the initial purchase was made are excluded from the influence table, since it would be difficult or impossible to separate the influencing consumer's influence from the influence of actually having been present at the retail venue.

For instance, referring to the example influence table illustrated in FIG. 6B, the influencing consumer was observed to have made 34 purchases in the product category "tea". This value can be obtained from the categorized purchase history table illustrated in FIG. 6A. A first consumer in the influencing consumer's circle of influence, identified as consumer 10b, was observed to have a related event in his/her activity history after 22 of the influencing consumer's 34 purchases. Examples of related events include purchasing the same or similar product, visiting a retail outlet where the same or similar product is sold, using a mobile application provided by a vendor of the product, or visiting an online shopping portal where the same or similar product is sold. Other events can be considered to be "related events" in other embodiments. Because consumer 10b appears to have been influenced by 65% (22 of 34) of the influencing consumer's purchase events, the influencing consumer is deemed to have a High degree of influence over consumer 10b with respect to product category "tea".

To provide another example, the influencing consumer was observed to have made nine purchases in the product category "travel". A second consumer in the influencing consumer's circle of influence, identified as consumer 10c, was observed to have a related event in his/her activity history after only one of the influencing consumer's nine purchases. Because consumer 10c appears to have been influenced by only 11% (1 of 9) of the influencing consumer's purchase events, the influencing consumer is deemed to have a Low degree of influence over consumer 10c with respect to product category "travel". It will be appreciated that the influencing consumer's purchases in the various product categories can be iteratively analyzed with respect to each consumer in the circle of influence, thus resulting in an influence table such as that illustrated in FIG. 6B.

The degree of influence wielded by an influencing consumer can be expressed as a percentage score, such as the aforementioned 22 of 34=65% or 1 of 9=11% example scores described above. However, in certain applications the degree of influence is more conveniently expressed categorically using descriptors such as High, Medium, and Low. Thus the influence evaluation process invoked by influence evaluation module 165 is optionally configured to assign such categorical descriptors to the degree of influence scores reflected in the influence table. See reference numeral 621 in FIG. 6B. Likewise, an aggregate influence score that represents the total influence wielded by an influencing consumer can be calculated. See reference numeral 622 in FIG. 6B. In one embodiment, the aggregate influence (AI) of a particular influencing consumer is provided by:

$$AI=(3\times N_h)+(2\times N_m)+N_l,$$

where $N_h$ is the number of consumers over which the influencing consumer has a High degree of influence, $N_m$ is the number of consumers over which the influencing consumer has a Medium degree of influence, and $N_l$ is the number of consumers over which the influencing consumer has a Low degree of influence. Other methods for determining aggregate influence can be used in other embodiments.

In certain embodiments communication module 150 saves circle of influence data 122 and degree of influence data 123 in memory 120. See reference numeral 623 in FIG. 6B. Circle of influence data 122 represents the consumers in a particular influencing consumer's circle of influence, while degree of influence data 123 represents the amount of influence the influencing consumer has over the various members of the circle of influence. Degree of influence data 123 is optionally segmented by product category, such that each member of the circle of influence has different degree of influence scores for different product categories. Degree of influence data also optionally includes an aggregate influence score of the influencing consumer. Circle of influence data 122 and degree of influence data 123 are optionally sent to the venue or an analyst associated with the venue, thus providing a more thorough understanding of the consumers who visit the venue. See reference numeral 624 in FIG. 6B. For example, an analyst can use this information to send targeted advertisements to members of the circle of influence of a purchasing consumer shortly after a purchase is consummated. In some cases a marketer's targeted communications may be further focused using the activity history of the consumer in the circle of influence. For example, the marketer may choose to only target those consumers in the circle of influence who have visited a particular venue within a certain time period.

Where the influence graph was previously rendered, display module 163 can update the influence graph to reflect the circle of influence, the degree of influence scores, and/or the aggregate influence score. See reference numeral 625 in FIG. 6B. In some cases a consumer's influence can be visualized using a timeline display wherein an initial purchase and the subsequent activity amongst the members of the purchaser's circle of influence are displayed on a timeline. If circle of influence or degree of influence analytics are to be produced for multiple consumers represented in the influence graph, method 600 can be repeated iteratively until the influence of all consumers of interest has been evaluated.

Methodology: Frequent Contact Identification

FIG. 7 is a flowchart illustrating an example frequent contact identification method 700 for identifying frequent contacts associated with a consumer of interest, and for assigning a proximity score to each of the identified frequent contacts. In this context, the "consumer of interest" is a consumer that is initially designated as such, either automatically or based on user input. The one or more "frequent contacts" are consumers who are identified, through an analytical process, as having frequent contact with the designated consumer of interest.

As can be seen, method 700 includes a number of phases and sub-processes, the sequence of which may vary from one embodiment to another. However, when considered in the aggregate, these phases and sub-processes form part of an improved behavioral analysis framework that is capable of identifying frequent contacts associated with a consumer of interest, and assigning a proximity score to each of the identified frequent contacts. Method 700 is responsive to user input and detected consumer behaviors in accordance with certain of the embodiments disclosed herein. Method 700 can be implemented, for example, using consumer analytics portal 100 illustrated in FIG. 4 and described herein. However other systems can be used in other embodiments, as will be apparent in light of this disclosure. To this end, the correlation of the various functionalities shown in FIG. 7 to the specific components illustrated in FIG. 4 is not intended to imply any structural and/or use limitations. Rather, other embodiments may include, for example, varying degrees of integration wherein multiple functionalities are effectively performed by one system or module. Thus other embodiments may have fewer or more modules depending on the granularity of implementation. FIG. 10 is a table summarizing, among other things, the consumer analytics parameters used in certain implementations of frequent contact identification method 700.

As illustrated in FIG. 7, method 700 commences with using communication module 150 to acquire consumer interaction data for a venue. See reference number 710 in FIG. 7. One way of collecting consumer interaction data for a venue includes positioning beacons at various locations throughout the venue. As a consumer carries his/her portable computing device around the venue, an application executing on the device receives advertising packets that are broadcast from the beacons and records beacon identifiers along with a timestamp indicating when the advertising packet was received. If two consumers report observing the same beacon at substantially the same time, then the two consumers can be understood as being present together at the venue. Examples of locations in a venue where beacons can be placed include on tables or chairs in a restaurant, in sections or individual seats in a stadium, on picnic tables at a park, on seats in an amusement park ride, in different sections of a brick-and-mortar retail outlet, on shopping carts, and the like.

In one embodiment a particular consumer of interest is identified based on a user selection. See reference numeral 711 in FIG. 7. In implementations where frequent contact identification is to be performed for multiple consumers, each of the multiple consumers can sequentially be designated as the consumer of interest. Thus the frequent contact identification method 700 can be performed repeatedly for multiple different consumers.

Once the consumer of interest is identified, the previously-acquired consumer interaction data can be used in the frequent contact identification process that is invoked by proximity analysis module 166 to identify p consumers having frequent contact with the consumer of interest. In one implementation a "frequent contact" is a consumer who, in timeframe $P_1$, spends more than duration $P_2$ with the consumer of interest on more than $P_3$ separate occasions. See reference numeral 712 in FIG. 7. When two consumers spend more than time $P_2$ together, this may be referred to as a "proximity event". Example values for the timeframe $P_1$ are 1 week, 2 weeks, 1 month, 3 months, 6 months, and 1 year, although other values, including intermediate values, can be used in other embodiments. Example values for the minimum duration $P_2$ are 10 minutes, 20 minutes, 30 minutes, 45 minutes, and 1 hour, although other values, including intermediate values, can be used in other embodiments. Example values for the minimum number of occurrences $P_3$ are 2 occurrences, 3 occurrences, 5 occurrences, 8 occurrences, and 10 occurrences, although other values, including intermediate values, can be used in other embodiments. Thus, for example, in one implementation the frequent contacts of a consumer of interest are those consumers who spent at least thirty minutes with the consumer of interest ($P_2$=30 minutes) on at least five separate occasions ($P_3$=5 occurrences) over the last three months ($P_1$=3 months). An index of the p frequent contacts for a given consumer of interest can be saved as frequent contact data 124 in memory 120.

In certain embodiments the frequent contact identification process further involves generating a proximity score that quantifies how close the relationship is between the consumer of interest and an identified frequent contact. In some cases the proximity score is refined based on different product categories in recognition of the fact that two consumers may often spend time together in a setting that is associated with a particular product category. When an interaction occurs in such a setting, this setting may be referred to as an "interaction context", or more simply, a "context". Thus, before generating the proximity scores it is first determined whether a context-specific proximity analysis is to be undertaken. See reference numeral 714 in FIG. 7. If the proximity analysis is not context-specific, a proximity score $S_{p'}$ is calculated for each of the p frequent contacts of the consumer of interest (p'=1, 2, 3, . . . , p), where $S_{p'} = N_{p'} W_1 + T_{p'} W_2$. See reference numeral 717 in FIG. 7. Here $N_{p'}$ is the number of times the p'th frequent contact was observed together with the consumer of interest during timeframe $P_1$; $W_1$ is a weight factor that attributes weight to the number of times the p'th frequent contact was observed together with the consumer of interest during timeframe $P_1$; $T_{p'}$ is the total amount of time that the p'th frequent contact was observed together with the consumer of interest during timeframe $P_1$; and $W_2$ is a weight factor that attributes weight to the total amount of time that the p'th frequent contact was observed together with the consumer of interest during timeframe $P_1$. Example values for the occurrence-based weight factor $W_1$ and the time-based weight factor $W_2$ are 0.25, 0.33, 0.50, 0.67, and 0.75, although other values, including intermediate values, can be used in other embodiments. The two weight factors $W_1$ and $W_2$ are not necessarily equal. The p proximity scores can be saved with frequent contact data 124 in memory 120.

If the proximity analysis is context-specific, c distinct interaction contexts in which the consumer of interest interacted with the p frequent contacts are identified. See reference numeral 715 in FIG. 7. In this case, in each of the c distinct contexts a proximity score $S_{c'p'}$ can be calculated for each of the p frequent contacts. See reference numeral 716 in FIG. 7. In this case p'=1, 2, 3, . . . , p and c'=1, 2, 3, . . . , c, such that a total of c×p proximity scores are calculated. The context-specific proximity score $S_{c'p'}$ is defined as $S_{c'p'} = N_{c'p'} W_1 + T_{c'p'} W_2$, where $N_{c'p'}$ is the number of times the p'th frequent contact was observed together with the consumer of interest during timeframe $P_1$ in the c'th interaction context and $T_{c'p'}$ is the total amount of time that the p'th frequent contact was observed together with the consumer of interest during timeframe $P_1$ in the c'th interaction context. The c×p proximity scores can be saved with frequent contact data 124 in memory 120. Assigning different proximity scores to different interaction contexts provides marketers with additional information about the relationship between the two consumers. For example, consider an implementation where Frank spends an hour with Gretchen at the gym every day after work, and occasionally also runs into her at the cafe in the morning. If Frank is designated as a consumer of interest, Gretchen may be considered as a frequent contact having a first, relatively high proximity score that is associated with the product category "personal fitness", and a second, relatively low proximity score that is associated with the product category "coffee".

As noted above, frequent contacts can be identified by using consumer interaction data to identify one or more frequent contacts who spent more than a threshold amount of time with the consumer of interest. However other methods for identifying frequent contacts can be used in other embodiments, including techniques that do not rely on observational data that characterizes offline consumer activity. For instance, in an alternative embodiment observational data that characterizes online consumer activity can be used to identify frequent contacts of the consumer of interest. Examples of such online consumer activity may include a consumer's web browsing history, social networking activity, and postings to a text messaging social network (such as Twitter (Twitter, Inc., San Francisco, Calif.)). In particular, consumers who visit the same websites, or who are connected and/or frequently interact with each other using social networking services can be assumed to be frequent contacts, even if such consumers are not actually observed together in an offline environment. For example, there is value in observing that the consumers schedule events together using a social networking service, even if the consumers are not actually observed together at the scheduled events. Therefore in certain embodiments frequent contacts are identified without the benefit of observational data that characterizes offline consumer activity.

Once calculated, communication module 150 can be configured to send frequent contact data 124 to the venue or an analyst associated with the venue, thus providing a more thorough understanding of the consumers who visit the venue. See reference numeral 718 in FIG. 7. Where frequent contacts are to be identified for multiple consumers of interest, frequent contact identification method 700 can be repeated as appropriate. In some applications, frequent contact data 124 is provided to attribute sharing module 167, where it can be used to propagate attributes from a digital marketing profile associated with the frequent contacts to a digital marketing profile of the consumer of interest about which relatively little is known, as will be described in turn.

Methodology: Attribute Propagation

FIGS. 8A and 8B comprise a flowchart illustrating an example attribute propagation method 800 for modifying a marketing profile of an unknown consumer based on marketing profile attributes of one or more frequent contacts of the unknown consumer. In this context, the "unknown consumer" is a consumer that is initially identified as being a consumer about which relatively little is known, for example based on having an incomplete or empty marketing profile. The one or more "frequent contacts" are consumers who are identified, for example through an analytical process, as having frequent contact with the unknown consumer. In one implementation, the frequent contacts are identified using the frequent contact identification method 700 illustrated in FIG. 7 and disclosed herein. In another implementation, the frequent contacts are identified based on a circle of influence generated using influence evaluation method 600 illustrated in FIGS. 6A and 6B and disclosed herein.

As can be seen, method 800 includes a number of phases and sub-processes, the sequence of which may vary from one embodiment to another. However, when considered in the aggregate, these phases and sub-processes form part of an improved behavioral analysis framework that is capable of modifying marketing profile attributes of an unknown consumer based on marketing profile attributes of one or more frequent contacts of the unknown consumer. Method 800 is responsive to user input and detected consumer behaviors in accordance with certain of the embodiments disclosed herein. Method 800 can be implemented, for example, using consumer analytics portal 100 illustrated in FIG. 4 and described herein. However other systems can be used in other embodiments, as will be apparent in light of this disclosure. To this end, the correlation of the various functionalities shown in FIGS. 8A and 8B to the specific components illustrated in FIG. 4 is not intended to imply any structural and/or use limitations. Rather, other embodiments may include, for example, varying degrees of integration wherein multiple functionalities are effectively performed by one system or module. Thus other embodiments may have fewer or more modules depending on the granularity of implementation. FIG. 10 is a table summarizing, among other things, the consumer analytics parameters used in certain implementations of attribute propagation method 800.

As illustrated in FIG. 8A, method 800 commences with using the attribute modification process invoked by attribute sharing module 167 to identify an unknown consumer. See reference numeral 810 in FIG. 8A. In some implementations the unknown consumer is identified based on user input, for example, from a marketer who has identified a consumer about which relatively little is known. In other implementations the unknown consumer is identified using an automated process, for example by analyzing consumer profiles and identifying those profiles which are empty or sparsely populated. Once the unknown consumer is identified, communication module 150 retrieves frequent contact data 124 from memory 120 that identifies p frequent contacts of the unknown consumer, p≥1. See reference numeral 811 in FIG. 8A. In one implementation the frequent contacts are identified using the proximity scores calculated in conjunction with the frequent contact identification method 700 illustrated in FIG. 7 and disclosed herein. In alternative implementation, the frequent contacts are identified based on the circle of influence and corresponding confidence levels determined in conjunction with influence evaluation method 600 illustrated in FIGS. 6A and 6B and disclosed herein.

To facilitate incremental analysis of the p frequent contacts, the attribute modification process compares the quantity p to a frequent contact counting parameter p', which is initially set such that p'=1. See reference numeral 812 in FIG. 8A. Attribute modification process identifies q attributes that are in the p'th frequent contact's profile, but that are not in the unknown consumer's profile. See reference numeral 814 in FIG. 8A. Because the q attributes are in the frequent contact's profile, but are not in the unknown consumer's profile, these attributes may be referred to as "asymmetric profile attributes" or "asymmetric attributes". To facilitate incremental analysis of the q asymmetric profile attributes, the attribute modification process compares the quantity q to an asymmetric profile attribute counting parameter q', which is initially set such that q'=1. See reference numeral 815 in FIG. 8A. The q'th asymmetric profile attribute can then be associated with the unknown contact. See reference numeral 816 in FIG. 8A.

In some cases the q'th asymmetric attribute may be specific to an interaction context c for which the unknown consumer and the p'th frequent contact have a context-specific proximity score $S_{c,p'}$. For example, unknown consumer Frank and frequent contact Gretchen go to the gym together every day after work. They therefore have a relatively high context-specific proximity score associated with the product category "personal fitness". If Gretchen has a profile attribute indicating a preference for a particular sports drink, this is an example of an attribute that is specific to an interaction context for which Frank and Gretchen have a context-specific proximity score. However, if Gretchen has a profile attribute indicating an income or age bracket, these are examples of profile attributes that are not specific to a particular interaction context. Thus, in some cases Frank and Gretchen may be linked only by a generic proximity score $S_{p'}$ that is not specific to any particular interaction context c. Thus in certain embodiments attribute modification process comprises making a determination whether or not the unknown consumer and the p'th frequent contact are linked by an asymmetric attribute q' that is associated with a context-specific proximity score $S_{c,p'}$. See reference numeral 817 in FIG. 8A.

If the unknown consumer and the p'th frequent contact are linked by an asymmetric attribute q' that is associated with a context-specific proximity score $S_{c'p'}$, then a score associated with the q'th asymmetric attribute is incremented by $S_{c'p'}$. See reference numeral 818 in FIG. 8A. On the other hand, if the unknown consumer and the p'th frequent contact are linked by an asymmetric attribute q' that is associated with a generic proximity score $S_{p'}$, then a score associated with the q'th asymmetric attribute is incremented by $S_{p'}$. See reference numeral 820 in FIG. 8B. Once the score associated with asymmetric attribute q' is appropriately incremented, this score is compared to a threshold score $P_5$ to determine whether asymmetric attribute q' should be added to the unknown contact's profile. See reference numeral 821 in FIG. 8B. In particular, if the score associated with asymmetric attribute q' is greater than $P_5$, then asymmetric attribute q' is added to the unknown contact's profile. See reference numeral 822 in FIG. 8B. In this case, the supplemented profile associated with the unknown consumer can be saved with attribute data 125 stored in memory 120.

Once the profile of the unknown consumer has been modified, if appropriate, the asymmetric profile attribute counting parameter q' is incremented. See reference numeral 823 in FIG. 8B. The incremented asymmetric attribute counting parameter q' is then compared to the total number of asymmetric attributes q which were identified as being in the frequent contact's profile, but not in the unknown consumer's profile. See reference numeral 824 in FIG. 8B. If q'≤q then there are additional parameters which should be similarly processed by attribute sharing module 167, as disclosed herein. However, if q'>q, then all asymmetric attributes have been processed. In this case, the frequent contact counting parameter p' is incremented. See reference numeral 825 in FIG. 8B. The incremented frequent contact counter parameter p' is then compared to the total number of frequent contacts p that were identified as being associated with unknown consumer. See reference numeral 826 in FIG. 8B. If p'≤p then there are additional frequent contacts which should be similarly processed by attribute sharing module 167, as disclosed herein. However, if p'>p, then all frequent contacts have been analyzed. In this case, communication module 150 can be configured to send the modified attribute data 125 to the venue or an analyst associated with the venue, thus providing a more thorough understanding of the unknown contact. See reference numeral 827 in FIG. 8B. Where attributes are to be propagated to multiple unknown consumers, attribute propagation method 800 can be repeated as appropriate.

Further Example Embodiments

The various analytical techniques disclosed herein help marketers understand the impact of purchases on an individual and aggregate level. For example, an individual consumer's purchase of a smartphone may be observed as driving a certain number of additional consumers to research smartphones, either online or in a retail outlet. In addition, the consumer who purchased the smartphone can also be understood as having an aggregate influence on his/her fellow consumers outside the context of an individual purchase. These insights allow the marketer to more efficiently allocate marketing efforts and resources, and in particular, leverage influence that other consumers may have already wielded. For example, a marketer can focus its efforts on consumers with high aggregate influence scores, and then once a purchase has occurred, the marketer can shift its efforts to focus on consumers within the purchaser's circle of influence, and in particular, on consumers over which the purchaser has a high degree of influence. This allows the marketer to use its resources more effectively.

There are a number of ways in which a marketer can target an influential consumer or an influenced consumer (collectively, a "targeted consumer"). For example, a push notification can be sent to sales staff alerting them to the presence of a targeted consumer in a particular section of a store. The sales staff can personally attend the targeted consumer. A discount can be offered to the targeted consumer for a particular category of products. In some cases the discount can be proportional to the degree of influence wielded by the targeted consumer. In some cases a targeted consumer can be offered to participate in a referral program wherein the targeted consumer can be offered discounts or other incentives in exchange for influencing his/her peers to research or purchase a particular product. In general, the effectiveness of the targeted consumer in influencing his peers can be measured using the various techniques disclosed herein.

Numerous variations and configurations will be apparent in light of this disclosure. For instance, one example embodiment provides a computer-implemented influence evaluation method. The method comprises receiving observational data that characterizes offline consumer activity. The observational data also defines correlated locations and timestamps that correspond to a plurality of offline observations of a corresponding plurality of consumers. The method further comprises identifying, based on the observational data, a consumer pair comprising a first consumer and a second consumer who were observed at a substantially similar location at a substantially similar time. The method further comprises defining two nodes on an influence graph that correspond to the first and second consumers, respectively. The two nodes are connected by an edge. The method further comprises assigning a confidence level to the edge. The confidence level forms part of the influence graph. The method further comprises assigning a degree of influence to the first consumer. The degree of influence is based on an observed activity of the first consumer in a time period after the second consumer consummated a purchase. The method further comprises updating respective consumer profiles associated with the first and second consumers based on the influence graph and the degree of influence. In some cases the method further comprises sending the influence graph and the degree of influence to an analyst associated with the location. In some cases the confidence level is based on an observation that the first and second consumers used a shared payment method at the substantially similar location. In some cases the confidence level is based on geolocation samples that characterize locations of the first and second consumers, wherein the confidence level is increased if a threshold proportion of the geolocation samples are within an established distance $\delta d$. In some cases (a) the node corresponding to the second consumer is connected to a plurality of other nodes in the influence graph; (b) each of the other nodes represents another consumer from amongst the plurality of consumers; (c) the method further comprises assigning an aggregate influence score to the second consumer; and (d) the aggregate influence score is based on a plurality of degrees of influence corresponding to the plurality of consumers associated with the plurality of other nodes. In some cases the degree of influence is associated with an interaction context that characterizes both the observed activity and the purchase. In some cases the first and second consumers are considered to have been observed at the substantially similar location at a substantially similar time when the observational data indicates that they were observed by a common beacon within an established time window $\delta t$. In some cases the first and second consumers are considered to have been observed at the substantially similar location and time when they were observed entering a venue within an established time window $\delta t_{in}$ of each other, and exiting the venue within an established time window $\delta t_{out}$ of each other.

Another example embodiment provides a computer program product encoded with instructions that, when executed by one or more processors, causes a profile attribute propagation process to be carried out. The process comprises receiving observational data that characterizes offline consumer activity. The observational data also defines correlated locations and timestamps that correspond to a plurality of offline observations of a corresponding plurality of consumers. The process further comprises identifying a first consumer having a first profile. The process further comprises identifying a second consumer who, based on the received observational data, has been observed with the first consumer. The second consumer has a second profile that includes a profile attribute. The process further comprises determining a proximity score for the second consumer based on the received observational data. The proximity score corresponds to a degree of proximity between the first and second consumers. The process further comprises associating the profile attribute with the first consumer. The process further comprises incrementing a score associated with the profile attribute. The increment corresponds to the proximity score. The process further comprises adding the profile attribute to the first profile in response to the incremented score exceeding a threshold score. In some cases the observational data includes a beacon identifier and a timestamp that defines a time at which one of the plurality of consumers received a transmission from a beacon associated with the beacon identifier. In some cases the proximity score is a function of a number of occasions on which the first and second consumers were observed together. In some cases the proximity score is a function of a total time that the first and second consumers were observed together. In some cases the proximity score is a function of (a) a number of occasions on which the first and second consumers were observed together in an interaction context associated with the profile attribute. In some cases the proximity score is a function of a total time that the first and second consumers were observed together in an interaction context associated with the profile attribute. In some cases the first consumer is identified as a result of the first profile having less than a threshold number of profile attributes. In some cases the second consumer was observed as spending more than $P_2$ minutes with the first consumer on more than $P_3$ occasions over a period of $P_1$ months.

Another example embodiment provides a consumer interaction analysis system that includes a memory device and a processor that is operatively coupled to the memory device. The processor is configured to execute instructions stored in the memory device that, when executed, cause the processor to carry out a consumer interaction analysis process. The process comprises receiving observational data that characterizes offline consumer activity. The observational data also defines correlated locations and timestamps that correspond to a plurality of offline observations of a corresponding plurality of consumers. The process further comprises receiving, from an analyst, a request for information about a first one of the plurality of consumers. The process further comprises identifying, based on the observational data, a second consumer that is related to the first consumer. The process further comprises identifying, based on the observational data, an offline activity of the second consumer. The offline activity is at least partially attributed to the first consumer. The process further comprises generating a digital marketing profile for the first consumer. The digital marketing profile includes attributes characterizing the offline activity of the second consumer. In some cases (a) the offline activity is a purchase of a product by the second consumer; and (b) the purchase is attributed to the first consumer as a result of first consumer having been observed as purchasing a same or similar product within a designated timeframe of the purchase by the second consumer. In some cases (a) the offline activity is spending time with the first consumer in an interaction context; and (b) the attributes in the digital marketing profile for the first consumer characterize the interaction context. In some cases the second consumer is identified based on having entered a venue within an established time window $\delta t_{in}$ of the first consumer, and exiting the venue within an established time window $\delta t_{out}$ of the first consumer. In some cases the second consumer is identified based on having spent more than $P_2$ minutes with the first consumer on more than $P_3$ occasions over a period of $P_1$ months.

Another example embodiment provides a computer-implemented profile attribute propagation method that comprises receiving observational data that characterizes activity of a plurality of consumers. The method further comprises identifying a first consumer having a first profile. The method further comprises identifying a second consumer who, based on the received observational data, shares a common interest with the first consumer. The second consumer has a second profile that includes a profile attribute. The method further comprises determining a proximity score for the second consumer based on the received observational data. The proximity score corresponds to a degree of proximity between the first and second consumers. The method further comprises adding the profile attribute to the first profile in response to the proximity score exceeding a threshold proximity value. In some cases the method further comprises (a) associating the profile attribute with the first consumer; (b) incrementing an aggregated score associated with the profile attribute by an increment that corresponds to the proximity score; and (c) adding the profile attribute to the first profile in response to the aggregated score exceeding a threshold aggregated score. In some cases the second consumer is identified as sharing the common interest with the first consumer based on the first and second consumers both having visited a website more than a threshold number of times per month. In some cases the second consumer is identified as sharing the common interest with the first consumer based on the first and second consumers both having expressed the common interest using a social networking resource. In some cases the second consumer is identified as sharing the common interest with the first consumer based on the first and second consumers both posting messages to a text messaging social network.

Another example embodiment provides a computer-implemented influence evaluation method that comprises receiving observational data that characterizes offline consumer activity. The observational data also defines correlated locations and timestamps that correspond to a plurality of offline observations of a corresponding plurality of consumers. The method further comprises identifying, from amongst the plurality of consumers, an influencing consumer. The method further comprises identifying, from amongst the plurality of consumers, and based on the received observational data, a plurality of influenced consumers. The influencing consumer wields influence over each of the plurality of influenced consumers. The method further comprises assigning a degree of influence to each of the influenced consumers. The degree of influence assigned to a particular influenced consumer is (a) based on an observed activity of the particular influenced consumer in a time period after the influencing consumer is observed to have taken a particular action, and (b) associated with a product category corresponding to the particular action. The method further comprises observing that the influencing consumer has consummated a purchase. The method further comprises, in response to observing that the influencing consumer has consummated the purchase, identifying, from amongst the plurality of influenced consumers, a particular influenced consumer to which a targeted marketing communication is to be sent. The particular included consumer is selected based on having an elevated degree of influence associated with a product category corresponding to the purchase. In some cases the influencing consumer is identified based on a user selection. In some cases the influencing consumer is identified based on an aggregate influence score. In some cases the particular action is selected from a group consisting of purchasing a product, researching a product online, and visiting a retailer that sells a product.

The foregoing disclosure has been presented for the purposes of illustration and description. It is not intended to be exhaustive or to limit the disclosure to the particular described embodiments. Therefore many modifications and variations are possible in light of this disclosure. Thus it is intended that the scope of the invention be limited not by this detailed description, but rather by the claims appended hereto.

What is claimed is:

1. A non-transitory computer program product encoded with instructions that, when executed by one or more processors, causes a profile attribute propagation process to be carried out, the process comprising:
   receiving observational data packets from a plurality of mobile computing devices associated with a corresponding plurality of users, wherein a given observational data packet includes data identifying (a) a particular one of a plurality of beacons that are deployed at a venue, and (b) a timestamp that defines a time at which a particular one of the mobile computing devices received a transmission from the particular beacon;
   using the received observational data to define correlated locations and timestamps that correspond to a plurality of offline observations of the plurality of users;
   identifying a first user having a first profile that (a) does not include a first profile attribute defining a demographic category, and (b) does not include a second profile attribute defining a user preference that is associated with the venue;
   identifying a second user who, based on the received observational data, has been observed entering and exiting the venue with the first user, wherein the second user has a second profile that included the first and second profile attributes before the second user was observed with the first user;
   determining a generic proximity score for the second user based on the received observational data, wherein the generic proximity score depends on a number of observed interactions between the first and second users;
   determining a context-specific proximity score for the second user based on the received observational data, wherein the context-specific proximity score depends on a number of observed interactions between the first and second users in a context associated with the user preference;
   associating the first and second profile attributes with the first user;
   incrementing a first score associated with the first profile attribute by an amount corresponding to the generic proximity score;
   adding the first profile attribute to the first profile in response to the incremented first score exceeding a first threshold score;
   incrementing a second score associated with the second profile attribute by an amount corresponding to the context-specific proximity score; and
   adding the second profile attribute to the first profile in response to the incremented second score exceeding a second threshold score.

2. The computer program product of claim 1, wherein the generic proximity score is also a function of a total time that the first and second users were observed together.

3. The computer program product of claim 1, wherein the context-specific proximity score is also a function of a total time that the first and second users were observed together in the context associated with the user preference.

4. The computer program product of claim 1, wherein the first user is identified as a result of the first profile having less than a threshold number of profile attributes.

5. The computer program product of claim 1, wherein the second user was observed as spending more than $P_2$ minutes with the first user on more than $P_3$ occasions over a period of $P_1$ months.

6. The non-transitory computer readable medium of claim 1, wherein the first and second users are considered to have exited the venue together when the observational data indicates that they were observed by a common beacon within an established time window $\delta t_{out}$.

7. The non-transitory computer program product of claim 1, wherein the given observational data packet further includes signal strength data that defines a position of the particular mobile computing device with respect to the particular beacon.

8. A computer-implemented profile attribute propagation method comprising:
executing, by one or more computing devices:
receiving observational data packets from a plurality of mobile computing devices associated with a corresponding plurality of users, wherein a given observational data packet includes data identifying (a) a particular one of a plurality of beacons that are deployed at a venue, and (b) a timestamp that defines a time at which a particular one of the mobile computing devices received a transmission from the particular beacon;
using the received observational data to define correlated locations and timestamps that correspond to a plurality of offline observations of the plurality of users;
identifying a first user having a first profile that (a) does not include a first profile attribute defining a demographic category, and (b) does not include a second profile attribute defining a user preference that is associated with the venue;
identifying a second user who, based on the received observational data, has been observed entering and exiting the venue with the first user, wherein the second user has a second profile that included the first and second profile attributes before the second user was observed with the first user;
determining a generic proximity score for the second user based on the received observational data, wherein the generic proximity score depends on a number of observed interactions between the first and second users;
determining a context-specific proximity score for the second user based on the received observational data, wherein the context-specific proximity score depends on a number of observed interactions between the first and second users in a context associated with the user preference;
associating the first and second profile attributes with the first user;
incrementing a first score associated with the first profile attribute by an amount corresponding to the generic proximity score;
adding the first profile attribute to the first profile in response to the incremented first score exceeding a first threshold score;
incrementing a second score associated with the second profile attribute by an amount corresponding to the context-specific proximity score; and
adding the second profile attribute to the first profile in response to the incremented second score exceeding a second threshold score.

9. The method of claim 8, wherein the given observational data packet further includes signal strength data that defines a position of the particular mobile computing device with respect to the particular beacon.

10. The method of claim 8, wherein the first and second users are considered to have entered the venue together when the observational data indicates that they were observed by a common beacon within an established time window $\delta t_{in}$.

11. The method of claim 8, wherein the first user is identified as a result of the first profile having less than a threshold number of profile attributes.

12. The method of claim 8, wherein the generic and context-specific proximity scores are each also a function of a total time that the first and second users spent together in the venue.

* * * * *